(12) United States Patent
Baptista et al.

(10) Patent No.: US 8,729,147 B2
(45) Date of Patent: May 20, 2014

(54) INK FOR USE IN A FLEXOGRAPHIC PRINTING PROCESS WITH WET ON WET CAPABILITY

(75) Inventors: Valter Marques Baptista, Sao Paulo (BR); Wilson Andrade Paduan, Sao Paulo (BR)

(73) Assignee: Technosolutions Assessoria Ltda, Barueri-SP (BR)

( * ) Notice: Subject to any disclaimer, the term of this patent is extended or adjusted under 35 U.S.C. 154(b) by 0 days.

(21) Appl. No.: 13/432,345

(22) Filed: Mar. 28, 2012

(65) Prior Publication Data

US 2012/0220683 A1  Aug. 30, 2012

Related U.S. Application Data

(60) Division of application No. 13/165,623, filed on Jun. 21, 2011, which is a continuation of application No. PCT/BR2009/000416, filed on Dec. 22, 2009.

(30) Foreign Application Priority Data

Dec. 22, 2008 (WO) ................ PCT/BR2008/000399

(51) Int. Cl.
*C08F 2/50* (2006.01)
*C08J 3/28* (2006.01)
*C09D 11/00* (2014.01)
*C09D 11/04* (2006.01)

(52) U.S. Cl.
USPC ................ 522/135; 522/71; 522/74; 522/87; 522/86; 522/113; 522/114; 522/120; 522/121; 522/122; 522/134; 522/144; 522/143; 522/162; 522/153; 522/154; 522/178; 522/181; 522/182

(58) Field of Classification Search
USPC ......... 522/71, 74, 84, 86, 113, 114, 120, 121, 522/122, 134, 135, 144, 143, 162, 153, 154, 522/178, 181, 182
See application file for complete search history.

(56) References Cited

U.S. PATENT DOCUMENTS 4,730,020 A   3/1988  Wilfinger et al.
5,690,028 A  11/1997  Schick
(Continued)

FOREIGN PATENT DOCUMENTS

EP     0 195 931 A1   10/1986
EP     1 480 819 B1    4/2009
WO    WO 2005/071027   8/2005

OTHER PUBLICATIONS

Sartomer Product Description for SR610. [online]. retrieved online on [Nov. 8, 2012]. Retrieved from <URL:http://www.sartomereurope.com/proddetail.asp?plid=1&sgid=6&prid=SR610>.*

(Continued)

*Primary Examiner* — Sanza McClendon
(74) *Attorney, Agent, or Firm* — Finnegan, Henderson, Farabow, Garrett & Dunner, LLP

(57) ABSTRACT

A flexographic printing ink for use in a flexographic printing process with wet on wet capability, comprising a polymer and a combination of liquids comprising radiation curable monomers and/or oligomers, diluents, colorants, additives, and photoinitiators, the components having the Hansen Solubility Parameters adjusted to generate an ink with a capability to form a gel having the required physical characteristics, and that is in a liquid form in the presence of a small quantity of non reactive solvent, or is brought to a liquid state during the printing process. The disclosure is also directed to a flexographic printing process with wet on wet capability based on controlled polymer or polymer segment precipitation that leads to gel formation of ink compounds by controlling the solubility parameter of the ink system.

25 Claims, 9 Drawing Sheets

(56) References Cited

U.S. PATENT DOCUMENTS

| | | | |
|---|---|---|---|
| 6,140,386 A | 10/2000 | Vanderhoff et al. | |
| 6,772,683 B2* | 8/2004 | Laksin et al. | 101/211 |
| 6,872,243 B2* | 3/2005 | Breton et al. | 106/31.29 |
| 7,479,511 B2 | 1/2009 | Laksin et al. | |
| 7,887,176 B2* | 2/2011 | Kovacs et al. | 347/102 |
| 2003/0154871 A1 | 8/2003 | Laksin et al. | |
| 2004/0115561 A1 | 6/2004 | Laksin et al. | |
| 2004/0157959 A1* | 8/2004 | Turgis et al. | 523/160 |
| 2005/0011404 A1* | 1/2005 | Patel et al. | 106/31.27 |
| 2006/0229412 A1 | 10/2006 | Laksin et al. | |
| 2007/0245915 A1* | 10/2007 | Kim | 101/395 |
| 2007/0245916 A1* | 10/2007 | Bird et al. | 101/416.1 |
| 2007/0263060 A1 | 11/2007 | Laksin et al. | |

OTHER PUBLICATIONS

Laromer LR8765 Product Description from BASF (Jun. 1997) [online]. Retrieved online on Nov. 8, 2012. retrieved from <URL:http://www2.basf.us/rawmaterials/pdfs/Lr8765.pdf/>.*

ASTM International, Designation: D2240-05 (Reapproved 2010), "Standard Test Method for Rubber Property—Durometer Hardness".

Buckley-Smith, M.K., "The Use of Solubility Parameters to Select Membrane Materials for Pervaporation of Organic Mixtures" Thesis, presented at the University of Waikato, Hamilton, New Zealand, for partial fulfillment of the requirements for the degree of Doctor of Philosophy; 225 pages (Jan. 2006).

International Search Report and Written Opinion issued in International Patent Application No. PCT/BR2009/000416, dated Jul. 26, 2010 (13 pages).

Koenhen, D.M et al., "The Determination of Solubility Parameters of Solvents and Polymers by Means of Correlations with Other Physical Quantities" *Journal of Applied Polymer Science*, 19:1163-1179 (1975).

Miller-Chou, B.A. et al., "A review of polymer dissolution" *Prog. Polym. Sci.*, 28:1223-1270 (2003).

Rogovina, L.Z. et al., "Definition of the Concept of Polymer Gel[1]" *Polymer Science, Ser.C*, 50(1):85-92 (2008).

Sartomer, "SMA® Resins in Solvent Based Formulations" Application Bulletin, 5 pages, Nov. 2005.

Solutia, Inc. "Butvare®: Polyvinyl Butyral Resin Properties & Uses" Pub. No. 2008084E, 32 pages (2006).

* cited by examiner

INK FOR USE IN A FLEXOGRAPHIC PRINTING PROCESS WITH WET ON WET CAPABILITY

CROSS REFERENCE TO RELATED APPLICATIONS

This application is a divisional of U.S. patent application Ser. No. 13/165,623, filed Jun. 21, 2011, which is a continuation of PCT/BR2009/000416, filed Dec. 22, 2009, which claims the priority of International PCT Application No. PCT/BR2008/000399, filed Dec. 22, 2008, the content of both incorporated herein by reference in their entirety.

FIELD OF THE INVENTION

This invention concerns to a flexographic printing process with wet on wet capability that is made possible by controlled gel formation based on precipitation of a polymer or segments thereof in ink formulations, causing formation of a gel with suitable mechanical strength to allow the required color trapping for a wet on wet flexographic printing process. This controlled precipitation is accomplished by controlling the Hansen Solubility Parameter of the ink system at all times. The wet on wet printing process is possible with or without intermediate air drying, with greatly reduction or no emission of VOLATILE ORGANIC COMPOUNDS (VOC), greatly reduced use of energy, and with a single final curing step by UV or EB radiation. The invention also concerns an ink and a printing apparatus for carrying out the process. The process is also suitable for letterpress printing.

BACKGROUND OF THE INVENTION

Flexographic printing has become the major printing process to produce flexible packages for food and non food products, especially in North and South Americas and share roughly an equal part of the production of gravures in Europe.

In Asia and in the Middle East the share of flexographic participation is still increasing since its quality continues to grow and the capability to print Asiatic characters is now easily obtained.

Flexographic printing has achieved many improvements since its invention like the anilox rolls that bring more consistency in the inking process, and the introduction of the closed inking chamber, that reduces exposure to volatile solvents present in the ink and maintains the ink viscosity stable for longer periods. Photopolymers were certainly one of the biggest contributions to quality, followed by direct laser engraving in the last 10 years. All of those contributions has forced the development of better inks and one of the most important components of those better inks is their color strength.

There is a close similarity between printing quality and screening resolution, anilox screening and volume of ink, particularly ink color strength. To improve the printing quality it is mandatory to increase also the screening that we are using. Gravure and offset use 150 to 200 lines per inch while the traditional flexography screening requests ranges between 100 and 140 lines per inch. The ability to avoid the smallest dots in the plate to penetrate into anilox cells defines the relation between the screening of plates and the anilox screening since for the anilox this relation is about 6-8 times bigger than for the plates.

In order to print 200 lines per inch it is necessary an anilox with 1200 to 1600 lines per inch, and as the anilox lines increase, the volume of inks to be transported decreases fast, even using the new YAG laser engraving technology to bring higher volume to the anilox rolls, demands of stronger inks to achieve the specified color densities for printing still existing.

Table 1 below shows a standard anilox charter available for flexographic printing nowadays.

TABLE 1

| Anilox Screening versus Volume | | | | | | | | | | | | | |
| --- | --- | --- | --- | --- | --- | --- | --- | --- | --- | --- | --- | --- | --- |
| L/inch | 150 | 205 | 250 | 305 | 355 | 410 | 460 | 510 | 560 | 610 | 660 | 710 | 760 |
| Min.[1] | 9.0 | 7.0 | 5.5 | 4.5 | 3.8 | 3.2 | 2.9 | 2.7 | 2.4 | 2.2 | 1.7 | 1.6 | 1.5 |
| Max.[1] | 18.0 | 14.0 | 11.5 | 9.5 | 7.2 | 6.2 | 5.3 | 5.0 | 4.2 | 3.8 | 3.2 | 4.4 | 4.2 |
| L/inch | 815 | | 865 | | 915 | | 965 | 1020 | 1120 | 1220 | 1320 | 1400 | 1500 |
| Min.[1] | 1.5 | | 1.4 | | 1.4 | | 1.4 | 1.3 | 1.2 | 1.2 | 1.2 | 1.0 | 1.0 |
| Max.[1] | 4.0 | | 4.0 | | 3.5 | | 3.0 | 2.9 | 2.6 | 2.4 | 2.0 | 1.8 | 1.6 |

[1]Volume in BCM (billions of cubic micron per square inch)

The reduced volume of high anilox screening as shown above is one of the great limitations on traditional flexographic inks which contain 50% to 70% of solvent in their composition reducing the possibility to increase the pigment load in the ink and consequently the ink color strength.

To increase the complexity in order to achieve high color densities demanded by the flexographic printing process it is not easy to transpose to the substrate all the ink present in the anilox since the ink layer remains partially on the anilox roll and in the printing plate surfaces.

The high Volatile Organic Compounds (VOC) and the low density color strength are two main residual problems for flexographic printing, constituting the next challenge to be achieved: obtaining a better quality ink and also developing a friendly environmental ink for the flexographic printing process.

U.S. Pat. No. 5,690,028, relates to a viscous radiation curable ink and the decrease of the ink viscosity by heating it before the application. After applied, the ink layer cools down and the viscosity increases again to an amount enough to support the overprint of other color and give a satisfactory color trapping. The main disadvantage verified on U.S. Pat. No. 5,690,028 is the difficulty to control the temperature of the ink and ensure that no significant variation occurs during the printing process.

Other inventions tried to solve these problems in many different ways. In the U.S. Pat. No. 6,772,683, incorporated herein by reference, it is suggested to use low viscosity flexographic printing inks which have a viscosity controlling diluents to implement wet trapping of the sequentially applied ink layers by controlling time between the ink layer. However, the time required for the solvent evaporation is too long.

U.S. Pat. No. 7,479,511 discloses a water based formulation using basically the same concepts of above mentioned U.S. Pat. No. 6,772,683 in terms of how the ink layers can be overprinted, but also focuses on the mobility of the reactive materials inside the final applied film, since lack of molecules mobility can lead to a low degree of conversion after the cure process.

In addition, U.S. Pat. No. 7,479,511 also uses some water retention to guarantee the necessary mobility of the system in order to achieve the desirable conversion degree. A correct amount of water is proposed as a compromise between minimum retention level and ability to withstand the overprint process in flexographic printing.

PCT/US2005/012603 proposes a layered material having two or more layers that can be curable by exposure to highly accelerated particles such as an electron beam. The layered material comprises a substrate, an ink formulation on at least a portion of the substrate. The ink formulation comprises ink and a monomer curable by free radical or cationic polymerization, and a lacquer comprising at least one monomer curable by free radical or cationic polymerization.

The above discussed solutions require high investments to add ultraviolet radiation (UV) or Electron Bean radiation (EB) installations and even the cost of the inks are high in comparison to the traditional solvent inks. Those Patents are based exactly in the same principle that occurs in the traditional solvent based system, since the intermediate drying in the Central Drum Flexographic machines is not strong enough to result in a completely dried ink layer.

Evidence that interstation drying of the flexographic printing process is not capable to assure complete drying of the ink, is given by a continuous research for low tack resins for flexographic solvent inks, since the tack of the non completely dried ink creates problems to the printing process, including color trapping and plate dust among others.

On the other side, the increased viscosity of the above discussed inks results in the difficulty to reach a total conversion of all reactive materials due to a low mobility created by the high viscosity, problem that U.S. Pat. No. 7,479,511 tries to solve by leaving some amount of water up to the moment that the ink passes through the curing system (EB or UV) and by implementing a complex balance of the presence of water.

OBJECTS OF THE INVENTION

It is an object of this invention to provide a flexographic printing system and process with the overprint color process without solvent or with a reduced amount of solvents, and at the same time providing inks that have higher color strength and exhibit a good adhesion to major substrates currently on the market.

Another object of this invention is a ink compositions that show the capability to print in a wet on wet basis and to be cured at the end of the process only, i.e., when leaving the printing machine, by means of ultraviolet radiation (UV) or Electron Bean radiation (EB).

SUMMARY OF THE INVENTION

The object of this patent may be achieved by providing a flexographic printing process involving gelation of the ink once applied to the substrate, said process being characterized by two important principles: the gelation or gel formation of the ink on the substrate and the use of Hansen Solubility Parameter to reach this gelation. This process is an overprint color process that uses reduced VOLATILE ORGANIC COMPOUNDS (VOC) content that means a reduced amount of solvents, and at the same time providing inks that have higher color strength and exhibit a good adhesion to major substrates currently on the market.

In this process the changes in Hansen Solubility Parameter of the ink is achieved by the printing machine which is able to change the ink formulation and it's solubility using devices that control the physicochemical ink characteristics, for example, in each ink layer before the application on the substrate and using only a final cure of the multilayer ink film by appropriate radiation (UV/EB). The devices responsible for controlling the physicochemical ink characteristics are known of the state of the art and are usually found on flexographic printers.

This invention also discloses a flexographic printing ink curable by UV/EB radiation which is a gel composed by a polymer and a combination of liquids mainly consisting of radiation curable monomers and/or oligomers, diluents, colorants, additives and/or photoinitiators, and optionally small amounts of non-reactive solvent. These compounds are combined to create a system with the ability to form a gel during what is customarily called the drying phase of the flexographic printing process. The controlled gel results from formation of a polymer chain network, or polymer segment precipitation forming such a network, because of a lack of solvency in the liquid media. This process can be understood and therefore controlled, if at all possible, by the Hansen Solubility Parameter as will be better discussed in the following.

BRIEF DESCRIPTION OF THE DRAWINGS

FIG. 6 also shows the nanoscale structure of a hydrogel's polymer network. The bar (lower right) represents 0.2 micrometer. L. Pakstis and Pochan; From Science News, Volume 161, No. 21, May 25, 2002, p. 323.

DETAILED DESCRIPTION OF THE INVENTION

Figure 1:
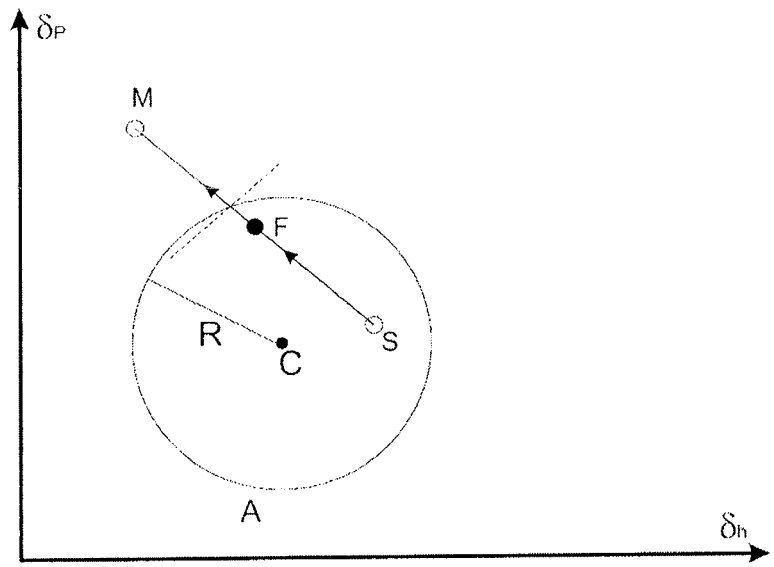
FIG. 1 and FIG. 2 show a schematic representation to explain the theoretical concept of changing and/or controlling the Hansen Solubility Parameter which sustains the present invention.

In this description the following definitions will be used.

Viscosity is defined as the resistance of a fluid (liquid or gas) to a change in shape, or movement of neighboring portions relative to one another. Viscosity denotes opposition to flow. The reciprocal of the viscosity is fluidity, a measure of the ease of flow. Molasses, for example, has a greater viscosity than water. Because part of a fluid that is forced to move carries along to some extent adjacent parts, viscosity may be thought of as internal friction between the molecules; such friction opposes the development of velocity differences within a fluid.

For many fluids the tangential, or shearing, stress that causes flow is directly proportional to the rate of shear strain, or rate of deformation, that result. In other words, the shear stress divided by the rate of shear strain is constant for a given fluid at a fixed temperature. This constant is called the dynamic, or absolute, viscosity and often simply the viscosity. (Encyclopedia Britannica) L. Z. Rogovina in Polymer Science Series C ISSN 1811-2382 (Print) 1555-614X (Online) DOI 10.1134/S1811238208010050 of 2008 proposes the following definition to gel: "a gel is a solid composed of at least two components, one of which (polymer) forms a three-dimensional network by virtue of covalent or noncovalent bonding (chemical and physical gels, respectively) in the medium of the other component (liquid), wherein the minimum amount of the liquid is sufficient for ensuring the elastic properties of the gel, although it may exceed tens to hundreds of times the amount of the polymer. It is noted that, at a high network density or high polymer-chain rigidity, the formation of fragile gels is possible. A general feature of physical gels is the existence of the yield point".

The same author also published on 1974 the following gel definition: "A gel is taken to be a polymer-solvent system in which the polymer, present at very low concentration, forms a quite stable three-dimensional network in the solvent. Consideration is given to the properties of gels in which the network is formed both by chemical and by physical bonds; attention is paid mainly to the second group of gels, in which variation in temperature produces a reversible transition between gel and solution." (L Z Rogovina et al 1974 *Russ. Chem. Rev.* 43 503-523 DOI: 10.1070/RC1974v043n06ABEH001821).

The definition of Hansen solubility parameter as found in Wikipedia is simple but complete and precise.

Hansen Solubility Parameters, also named reverse solvency principle, were developed by Charles Hansen as a way of predicting if one material will dissolve in another and form a solution. They are based on the idea that like dissolves like where one molecule is defined as being 'like' another if it bonds to itself in a similar way.

Specifically, each molecule is given three Hansen parameters, each generally measured in $Mpa^{0.5}$:

$\delta_d$ The energy from dispersion bonds between molecules
$\delta_p$ The energy from polar bonds between molecules
$\delta_h$ The energy from hydrogen bonds between molecules These three parameters can be treated as co-ordinates for a point in three dimensions also known as the Hansen space. The nearer two molecules are in this three dimensional space, the more likely they are to dissolve into each other. To determine if the parameters of two molecules (usually a solvent and a polymer) are within range a value called interaction radius ($R_0$) is given to the substance being dissolved. This value determines the radius of the sphere in Hansen space and its center is the three Hansen parameters. To calculate the distance (Ra) between Hansen parameters in Hansen space the following formula is used:

$$(Ra)^2 = 4(\delta_{d2}-\delta_{d1})^2 + (\delta_{p2}-\delta_{p1})^2 + (\delta_{h2}-\delta_{h1})^2$$

Combining this with the interaction radius gives the relative energy difference (RED) of the system:

$$RED = Ra/R_0$$

RED<1 the molecules are alike and will dissolve RED=1 the system will partially dissolve RED>1 the system will not dissolve Summarizing the differences between those concepts, it is defined that gel is a two phases system, composed by a solid network phase swollen by a liquid phase, instead a single phase of viscous homogeneous liquid. In fact, the establishment of the two phases by a second order transition in the moment of gelation instead of a first order transition of viscosity increasing is the major difference between the two phenomena.

Also a very important differences between gel and viscous liquids resides on the fact that gel has no defined viscosity, since the gel has no yield value up to the gel is destroyed and after that, without any change in the formulation or in the temperature, but only in the applied shear rate, gel show infinity viscosities, making impossible define a precisely viscosity.

Wet trapping, or wet on wet ink printing, is a printing process in which a first layer of ink deposited at a first inking station is not dry when a second layer of ink is superposed to the first layer at a second inking station. Wet trapping is disclosed, e.g., in US 2003/0154871.

The first object of the invention provides a flexographic printing process which comprises the following steps:
  a) Printing on a substrate a first layer of a radiation curable ink suitable for wet on wet flexographic printing, said ink comprising a combination of one or more non-reactive polymers and optionally one or more non reactive solvents with at least one reactive monomer and/or oligomer, pigments and additives, whereby said polymer(s) are only partially soluble in said monomer(s) and/or oligomer(s) or soluble after adding non reactive solvents;
  b) Bringing said printed first ink layer to a gel state, said gel ink layer having a strength sufficient to withstand subsequent printing steps;
  c) Subsequently printing a second ink layer in a liquid state over at least part of said previously gelled first ink layer, said second ink layer changing into a gel layer upon printing;
  d) Printing all sequential ink layers following the steps a) to c) up to the point that all colors are applied on to the substrate.
  e) Curing simultaneously all the ink layers at the end of the process using EB or UV radiation.

The desirable multiple layer overprinting required by this process is achieved by gel formation in each applied layer prior to application of the next layer with a final cure of the multilayer ink film by appropriate radiation (UV/EB). This mechanism is completely different from the usual liquid viscosity increase present in all traditional flexographic printing process and also employed in the previous art as described in the patents above discussed.

Control of the gelling process can be best accomplished when the Hansen Solubility Parameter of the medium is adjusted and/or changed so that the ink system becomes incapable of keeping the selected polymer, or segments in the selected polymer, in a truly dissolved condition, that is to say in solution. The ultimate result of this controlled insolubility is polymer, or polymer segment, precipitation leading to formation of a swollen gel having contact points where polymer or polymer segments meet. These polymer entities "join" together, not being able to reside in the liquid where there is controlled insolubility. Stated in another way, the insoluble polymer entities seek each other, having similar/identical Hansen solubility parameters. They are not able to reside in the liquid where the Hansen solubility parameters are too different to allow solution as discussed in more detail in the following.

The controlled gelling process creates a network of polymer chains that resembles a solid-like system with respect to the forces that are active in the overprinting flexographic process. This relative strength is the reason for a successful wet on wet overprinting process. Each gelled layer has the capacity of supporting itself and also to accept subsequent color layers without problems.

The precipitation or gel forming process may be controlled to occur, for example, even if only a small part of the nonreactive solvent, when it is present, evaporates. Some polymers are made of separate blocks or segments that are covalently bonded into one large molecule. In the event that some of the polymer segments are insoluble by the monomers and oligomers that form at least part of the "solvent" medium of the ink, while other polymer segments are indeed soluble by them, then it is possible that a suitably gelled system, physically bound together by the insoluble segments, can works without the use of nonreactive solvents or with limited amounts of these. In such cases shear forces alone can convert such reversible gels to liquids, with the gel rapidly reforming on the printed surface. An example of such a system is a polyester (or oil modified polyester) that also has blocks or segments of a polyamide. The different solubility characteristics of the polyester portions compared with the polyamide portions allow gelling based on non-solubility of the polyamide parts to each other in a liquid which does indeed dissolve the polyester. In principle the reverse gel could also be generated by dissolving the polyamide segments and precipitating the polyester segments, but the liquids required for this are not favorable environmentally and in practice as those required for dissolving polyester. Polymers with dual nature of this kind can also allow extremely low amounts of nonreactive solvents being required to produce the desired gels.

Gelled films produced by the methods of this invention can be overprinted much faster and more readily than those formed by the viscosity increase mechanism of the prior art; they are provided with excellent trapping properties than are in general much better than the wet trapping properties obtainable through offset printing.

During the precipitation, the polymers create a network in the medium that results in a solid-like system with respect to the forces that will act in the overprinting flexographic process, and creates the possibility of carrying out said overprinting process—i.e. the capacity to support and accept the other colors layers onto pre-printed ones. In the flexographic printing process, the gel is instantaneously formed when applied in a very thin layer with very high color strength inks. The applied layer in flexographic printing varies between 0.3 to 2.5 microns, on average; under the influence of a surface energy from the substrate and of the previously applied ink layers (if any), the gel formed in the printing process can be considered as an instantaneous gel formation.

The gel strength is preferably expressed and identified by giving the gel hardness in an appropriated scale as Shore 00, measured by ASTM D2240-05 Standard Test Method for Rubber Property on the gel as formed, before gel curing. Under the laboratory conditions, to measure the desirable gel hardness, preparation of a sample of ink big enough (a few hundred grams) is needed also due to the size of the Durometer.

This flexographic printing involving gelation of the ink once applied to the substrate with a completely different approach to solve the compromise of wet trapping and cure degree. The solution of the problem resides on the totally different system state, i.e. a gel rather than a concentrated solution. With respect to those know in the art there are provided by the present invention two important principles and differences: the gelation or gel formation of the ink on the substrate and the use of Hansen Solubility Parameter to reach this gelation.

Additionally, all agitation generated during the printing phase ceases after ink deposition onto the substrate, given a substantial help to the gellation of the applied ink layer.

The gel state is defined as a solid-like by the main researchers of the matter, but a solid that has a huge degree of mobility of the liquids inside of the system and also a state that can be reversed to a liquid state by certain amount of heat, in the same order that the one that is generated in the moment of the cure by the exothermic reaction.

Motion caused by shear forces, for example, can also convert gels to liquids, especially when the polymer forming the gel has blocks or segments that are not soluble in the liquid phase, whereas some other parts of the polymer are truly soluble in the liquid phase. The shear forces can be sufficient to pull the gelled segments apart, allowing them to again reform a gel when the external shear forces are no longer present. This situation can also be used to produce inks of quality and performance similar to those containing smaller amounts of nonreactive volatile solvent. In any case control of the Hansen Solubility Parameters in the inks is required as discussed in the following.

The invention refers to a flexographic process with wet on wet capability (wet trapping) based on gel formation or gel temporary dissolution of flexographic printing inks by controlling the Hansen Solubility Parameter of the ink system. The mechanism to obtain desirable wet on wet color trapping is based on gel formation in the applied ink using a controlled physicochemical mechanism of polymer precipitation. This can be done by controlling the Hansen Solubility Parameter, for example, by heating or by evaporation of a non-reactive and volatile solvent, leaving behind a liquid that does not dissolve a given polymer or segments thereof.

This flexographic printing process with wet on wet capability based on controlled precipitation leading to a gelation of ink formulations by changing the Hansen Solubility Parameter of the ink system applying heat in the ink used, with or without intermediate air drying and final cure by radiation means. The process can use radiation curable inks which are cured only after all colors are applied onto a substrate. A flexographic ink has a viscosity of less than 4000 cps, preferably less than 2500 cps and most preferably less than 1000 cps when it is applied to the final substrate.

This invention analyses what can be defined as reverse solvency, controlling or changing the Hansen Solubility Parameter of the medium in such way as to get some modified degree of solvency or solvation of the chosen polymer to produce a gel, or solid-like, layer of ink having enough strength and rigidity to support a flexographic overprint process or a letterpress printing process.

The great advantage of this principle is the ability to produce this phenomenon with a very low level of solvent, because of the operational basis of Hansen Solubility Parameters. The selection of polymer and liquids that will compose the final formulation can be done in such a way as to have Hansen Solubility Parameters of the incompatible reactive liquid in the gel right in the solubility border of the polymer, or just marginally solvate of given segments of the polymer. Very small changes in the amount of an appropriate solvent or modification in the solubility parameter of the reactive liquid with the right Hansen Solubility Parameters can adjust the state from liquid to gel or vice versa.

Figure 6:
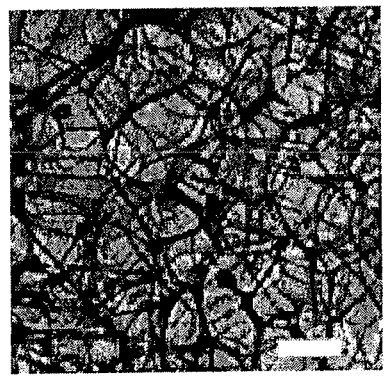
FIG. 6 shows a microphotograph of a gel network formed by polyvinyl Alcohol in water, with characteristic frames of polymer and a huge volume of free space filled by liquid.

The present invention, based on gel formation of the ink during the printing process, namely between two adjacent inking stations, allows the successful practice of the overprinting process. As can be seen in FIG. 6, the present invention takes advantage of both the mobility of the low viscosity liquid throughout the huge free space within the polymer gel network and of the gel destruction during the curing. This gel destruction is caused by the heat generated by the exothermic chemical reaction during curing. It is well known that physical gels are very sensitive to heat. The film once more becomes liquid or liquid-like, and can flow together to form a strong cured print. The solubility regions shown in FIGS. 1, 2, and 7 increase with higher temperature, and liquids with Hansen Solubility Parameters just outside the solubility boundary at room temperature become good solvents at elevated temperature. In the present invention this effect aids in the desired breaking of the gel at higher temperatures. This concept is at the basis of the ink which is the second embodiment of the invention, where a gelled ink is initially prepared to be just outside the solubility boundary at room temperature.

The high mobility of the reactive components during the cure process in the gel, and after the gel is broken as the temperature increases in the curing phase, assures the highest degree of chemical conversion without any additional control or apparatus.

This flexographic printing process use a flexographic printing machine that comprises means for heating or subjecting to shear forces a gelled ink as above discussed, i.e. a gel ink that is suitable to be changed by agitation or heat application from a gel state into a fluid ink with less than 4000 and preferably less than 2500 cps in order to be applicable by the ink system present in the flexographic printing machine.

It is therefore a further object of the present invention a flexographic printing machine that comprises means for heating and/or means for stirring or applying a shear force to an ink before applying said ink to the final substrate.

A flexographic printing machine according to the invention comprises means for heating or subjecting to shear forces a gelled ink as above discussed, i.e. a gel ink that is suitable to be changed by agitation or heat application from a gel state into a fluid ink with less than 4000 and preferably less than 2500 cps in order to be applicable by the ink system present in the flexographic printing machine.

As shown in the figures, said machine comprises ink transfer means including anilox rolls and printing plates, further comprising cleaning means to remove excess ink applied over the anilox rolls in such way as to leave the ink only inside of the anilox roll cells, like a blade applied in gravure or conventional flexographic system, with or without enclosed chamber.

FIGS. 9 to 12 shows a possible designs for the new flexographic printing machine, although different designs are not excluded, those designs cover a reasonable range of possibilities and shows a easily way to adapt especially the flexographic printing machine in a such way to turns the use of gelled ink easier than the traditional solvent flexo inks like IroFlex™ series from Toyo Inks and FlexiRange™ from FlintGroup.

Figure 9:
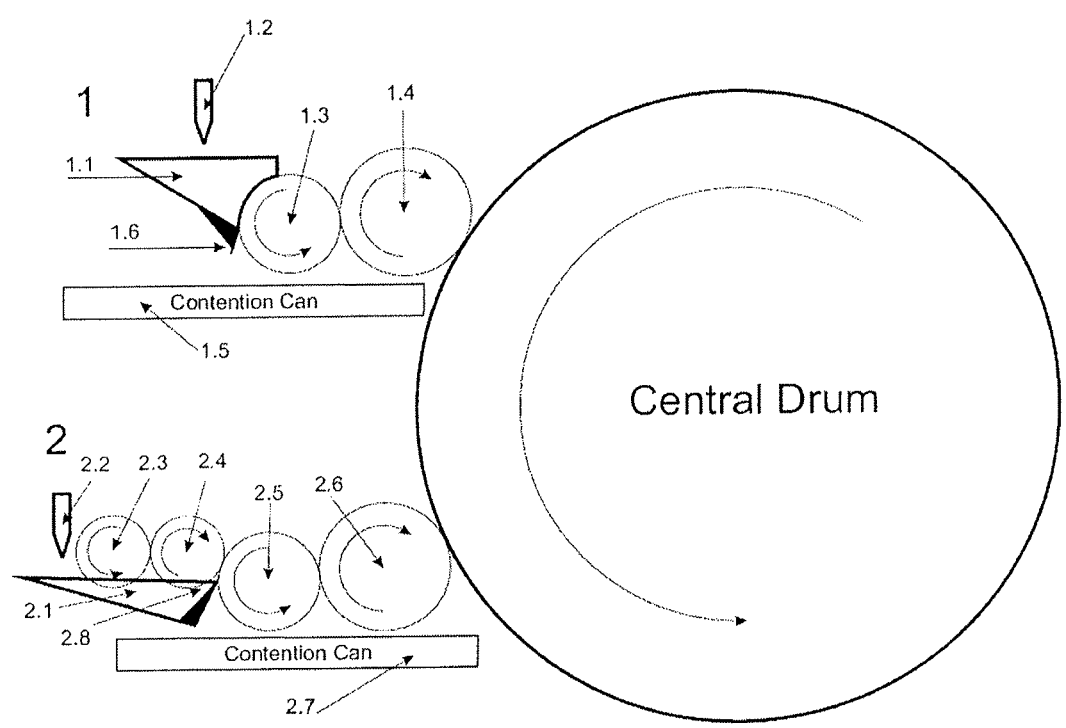
FIGS. 9 to 11 show different possibility of construction for the flexographic inking system able to handle gellified flexographic inks.

More specifically, FIG. 9 shows a Flexographic printing machine with a central drum and two different feeding systems under references 1 and 2. In reference 1 there is provided an automatic or manual feeding system (1.2) feeding the Ink Tray (1.1) that supply the ink directly to the anilox roll (1.3), cleaned by a Doctor Blade (1.6) and then inking the plate on plate cylinder (1.4) and from the plate, ink is applied to the substrate. The contention can (1.5) is located bellow all inking system to avoid contamination of other color in case of spilling.

Additionally, FIG. 9 under reference 2 shows a Flexographic printing machine with automatic or manual feeding system (2.2) feeding the ink Tray (2.1) that supplies the ink to the metering roll (2.3) to reduce the amount of ink transferred again to inking roll (2.4) and from the inking roll to anilox roll (2.5), cleaned by Doctor Blade (2.8) and then inking the plate on plate cylinder (2.6) and from the plate, ink is applied to the substrate (not shown). The contention can (2.7) is located below all inking system to avoid contamination of other color in case of spilling.

Figure 10:
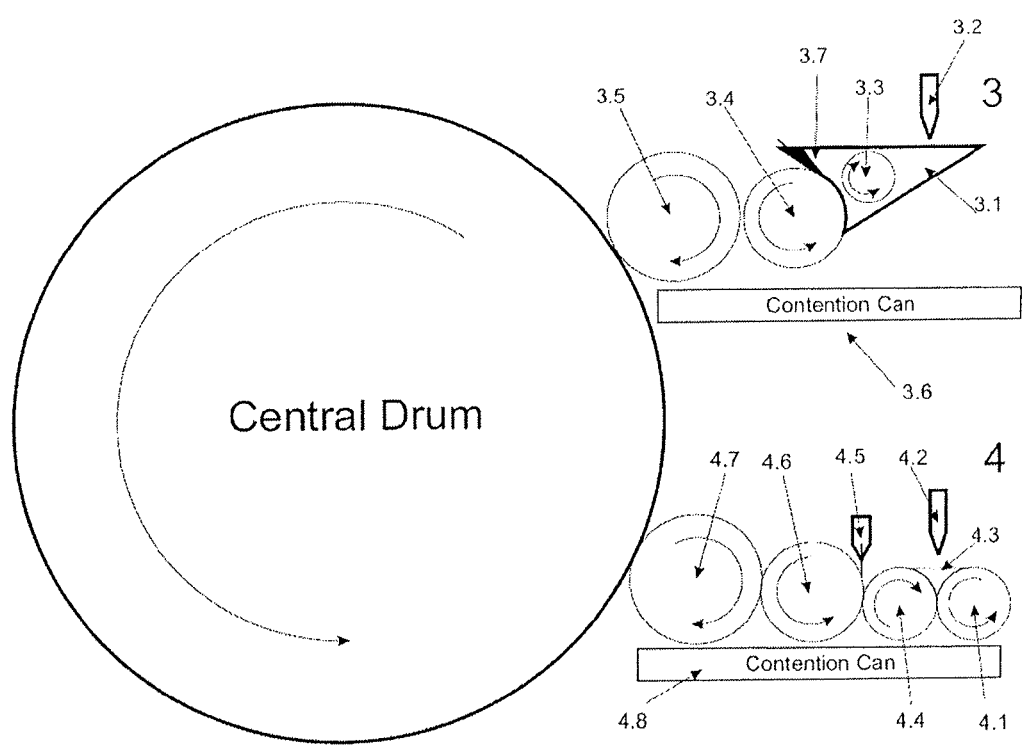
Figure 11:
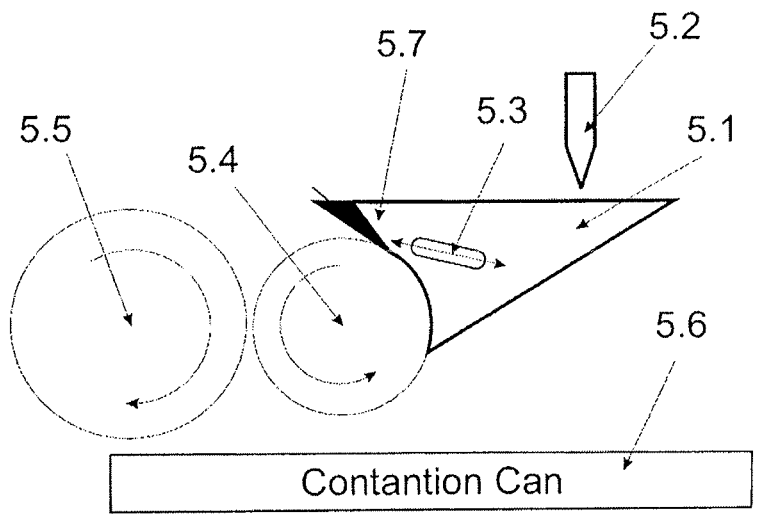

FIG. 10 shows two other possible constructions of the inking system to handle the gelled ink. Under reference 3 is shown a feeding system (3.2) feeding the Ink Tray (3.1) that supplies the ink directly to anilox roll (3.4) after the amount of applied ink to the anilox is controlled by the metering roll (3.3), then the excess of ink is cleaned by a Doctor Blade (3.7) and then the residual ink in the anilox roll is applied to the plate cylinder (3.5) and from the plate, ink is applied to the substrate. A contention can (3.6) is located below the whole inking system to contain spilled ink and avoid contamination of other color in case of spilling.

The reference 4, on FIG. 10, presents a different inking system in the absence of conventional ink tray, replaced by a system similar to that used in the field of solventless laminators, where the gelled ink reservoir (4.3) supplied automatically or manually by feeding system (4.2) is formed by a low speed metering roll (4.1) and medium speed metering roll (4.4) that apply a sufficient amount of ink to completely cover the anilox roll (4.6) cleaned from this excess of ink by the blade (4.5) to be applied as a very thin layer over the printing plate attached to the plate cylinder (4.7) and then finally transferred to the substrate. As in the other examples, the contention can (4.8) must be applied to prevent color contamination in case of ink spilling.

As shown in the FIGS. 3, 4, 5, 9, 10 e 11, said machine comprises ink transfer means including anilox rolls and printing plates, further comprising cleaning means to remove excess ink applied over the anilox rolls in such way as to leave the ink only inside of the anilox roll cells, like a blade applied in gravure or conventional flexographic system, with or without enclosed chamber.

After printing, the temperature decreases again to desirable range and the agitation ceases leading the ink to the gel state again. The printed ink layers became a gel state upon the substrate surface and all those layers shows enough rigidity to assure the wet trapping of the incoming next colors, up to the appliance of all color and subsequently exposed to radiation energy to initiate the curing/polymerization of curable components of the ink. This embodiment has the advantage of providing a flexographic printing ink that is free from organic solvents, i.e. that is VOLATILE ORGANIC COMPOUNDS free. Such a characteristic is of the utmost importance for the economy of the printing process and apparatus.

Current flexographic printing technology uses 6 to 12 sequential colors to achieve the final result, but it is very rare that more than 4 or 5 colors are applied one over the other, because trapping problems become more significant in thicker layers of ink, even with traditional solvent based inks.

Figure 3:
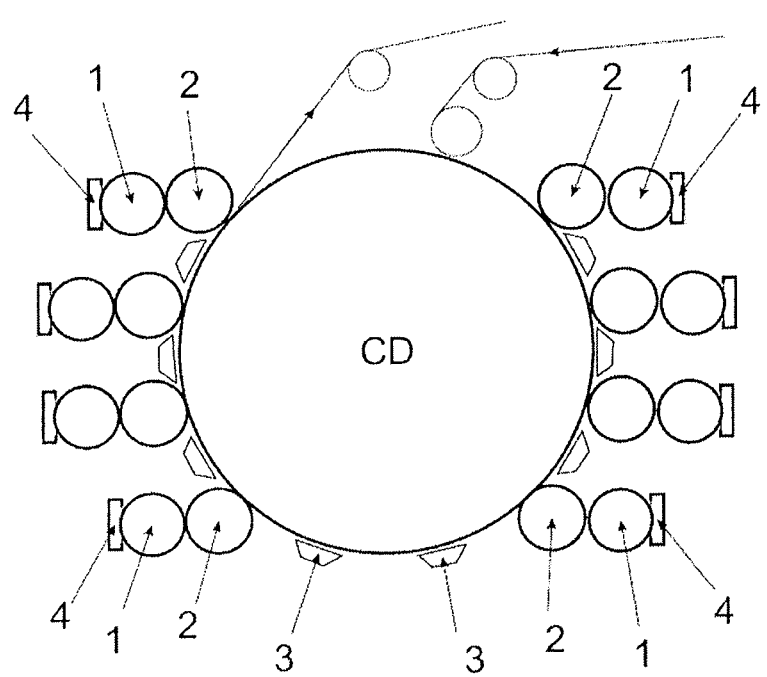
FIG. 3 shows a diagrammatic representation of a traditional flexographic Printing Press.

FIG. 3 shows a traditional Flexographic Printing Press, where the Central Drum (CD), the anilox cylinders (1), the plate cylinders (2), the driers (3), and the encapsulated doctor blades (4), are represented.

Figure 4:
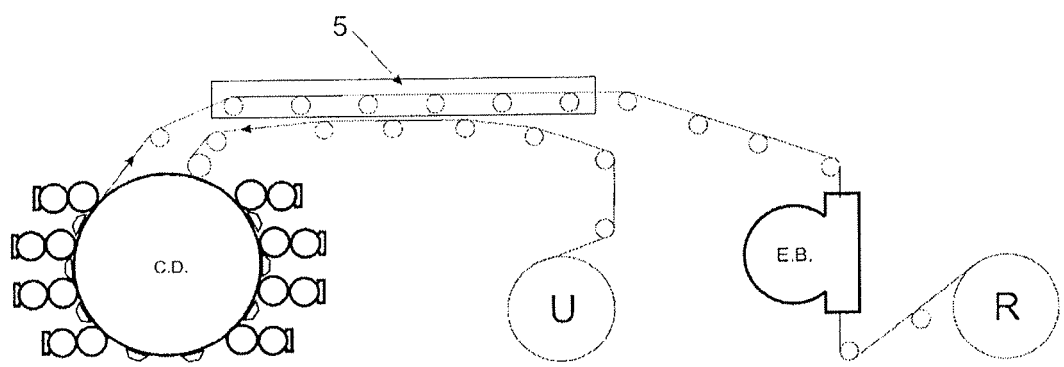
FIG. 4 shows the flexographic Printing Press containing an EB capability.
Figure 5:
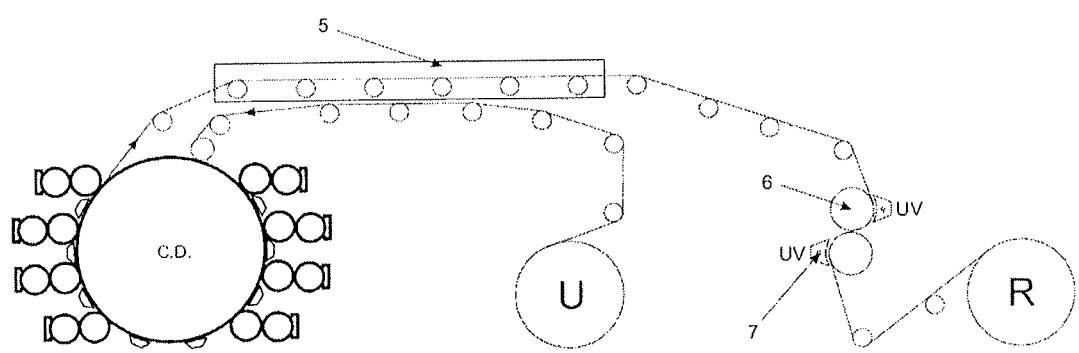
FIG. 5 shows the flexographic Printing Press containing an UV capability.

As mentioned before the present invention can be performed without any machinery modification, except by the addition of EB or UV curing unit at the end of the process, if such is not already present, when the substrate leaves the final drying tunnel (5), as shown in FIG. 4 for EB capability and in FIG. 5 for UV capability.

According to FIG. 4, the substrate is transferred from the unwinder (U) to the central drum (CD) and then to the final drying tunnel (5) and then to the Electron Beam device (EB) and to the rewinder (R). A similar path is found in the situation shown in FIG. 5. Here the substrate, after passing through the final dryer tunnel (5) reaches the chill rolls (6) and Ultraviolet light devices (UV), as lamps and reflectors, and then to the rewinder (R).

The main problem to use those inks especially in flexographic process is the management of the ink in the gel state, since the heating of the ink demand time and the pumping system of traditional flexographic machines are very sensitive to the presence of high viscosity inks inside of the system.

Also the extension of the tubes that conduces the ink through the inking system is a source of more problems and difficulties to the printers. In order to solve those problems and since the inks can show a VOLATILE ORGANIC COMPOUNDS free formulations, the solution can be related to the use a different flexographic inking system, without the doctor blades system.

The invention also provides a gelled flexographic printing ink curable by UV/EB radiation which comprises a polymer and a combination of liquids mainly consisting of radiation curable monomers and/or oligomers, additives, photoinitiators, and optionally small amounts of non-reactive solvent and where the said polymer act as a gellant.

All components used in this ink has the Hansen Solubility Parameters, and this flexographic printing ink is normally a gel having the required physical characteristics and is brought to a liquid state during the printing process, usually by means of mechanical or thermal action, becoming a liquid with viscosity suitable to be used in flexographic printing (e.g of less than 4000 and most preferably less than 2500 cps) and that return to a gel state after having been applied to the final support.

For those ink formulations that contains solvent to adjust the solubility parameter, the time to evaporate enough solvent to form the gel state is sufficient also to allow the right gel hardness to measures, but as gel is formed even with partial removal of the solvent, the best measures is taken after solvent removal, e.g. after a constant weight of the sample is achieved to ensure a complete solvent removal, and preferably not before 15 minutes after the temperature of the prepared formula reaches the temperature of the room.

In the case of solvent free ink formulations, 30 minutes is usually required to establish the gel in samples of a few hundreds grams with a constant and stable measurement.

First, the invention provides an ink within the Hansen Solubility Parameters with a non reactive solvent which is at least in part evaporated to provide the required gel and is normally a gel having the required physical characteristics and is brought to a liquid state during the printing process, usually by means of mechanical or thermal action in the cases of non application of non reactive solvent.

If the ink still using solvent in the formulation, the invention provides at least two great improvements over traditional solvent flexographic inks:
very strong inks with a viscosity below 2.500 cps are easily achieved due to a characteristic of selected monomers and oligomers which are able to print in a wet on wet basis and exhibit a high load pigment capacity;
the inks obtained can show a reduced VOLATILE ORGANIC COMPOUNDS, even below 15% of total formula, in comparison with formulation inks from prior art having high solids solvents that use about 50% of VOLATILE ORGANIC COMPOUNDS in their composition.

The combination of those two characteristics—very strong color inks and low VOLATILE ORGANIC COMPOUNDS—gives an ink the capability to meet the European and American VOLATILE ORGANIC COMPOUNDS and pollution regulations, without any pre or final treatment in the air or residues. These measures reduce the cost of final products, improve the ink quality and contribute to the environmental preservation.

If a solvent are added into the ink composition, the main criteria to choose the solvent can be summarized as follows:
a) The selected solvent must show stability in the medium (e.g. avoid Alcohols and Glycols that could undergo transesterification in a short period of time, generating toxic acrylates).
b) A nonreactive solvent useful in this invention should be chosen from those that are the most human friendly as possible, with low skin and respiratory irritation, and also being compatible with the final destination of the ink (Flexible food packaging, for instance).
c) In order to minimize the amount of nonreactive solvent added, preferred choices will have Hansen Solubility Parameters as far as possible from the Hansen Solubility Parameters of the final formulated mixture. The Hansen Solubility Parameters of mixtures are calculated from weight (or volume) averaging of the Hansen Solubility Parameters of the individual components. The effect of a given component on this average is greater at the same concentration when its Hansen Solubility Parameters are further from the final average. This provides the potential for greatly reduced levels of nonreactive solvent.
d) The Hansen Solubility Parameters and concentration of any nonreactive solvent that may be present must lead to a final position on the Hansen Solubility charts, such as those shown in FIGS. 1, 2, and 7, that is just within the region defined by the polymer radius of solubility. Its evaporation will then lead to the desired gel formation, since the Hansen Solubility Parameters of the liquid remaining are then moved to just outside the boundary defining the solubility of the polymer. This leads to the gel formation as above disclosed.
e) In Hansen Solubility Parameter diagrams such as those shown in FIGS. 1, 2, and 7, the line connecting the averaged Hansen Solubility Parameters of the liquids in the formulated ink and the Hansen Solubility Parameters of any chosen solvent in the formulation should preferably pass through the polymer center of solubility since this is the most sensitive point for efficient gel destruction resulting in a low viscosity flexographic applicable ink with less than 4000 cps and preferably less than 2500 cps and mostly preferably less than 1000 cps of the formulation.

f) The boiling point of any chosen nonreactive solvent that may be in the formulation is preferably lower than the boiling point of any of the monomers present in order to assure its evaporation without any noticeable loss of monomers.

With respect to the selection of solvents for the practice of this invention, preferred solvents are those with medium to low relative evaporation rates, preferably between 5 and 100 on the relative evaporation rate scale with the evaporation rate of n-Butyl Acetate being set equal to 100. The solvent should have very low toxicity and suitable Hansen Solubility Parameters in relation to the majority of the UV/EB monomers and oligomers to control the gel process as described above.

Following the established criteria for selection of the right nonreactive solvents for practice of the present invention, preferred solvents include, but are not limited to: Propylene Glycol Monomethyl Ether, Dipropylene Glycol Monomethyl Ether, Propylene Glycol Monomethyl Ether Acetate, n-Propyl Propionate, n-Butyl Propionate, n-Pentyl Propionate, Propylene Glycol Diacetate, Diethyl Carbonate, and Dimethyl Carbonate. The use of nonreactive solvents having medium to low relative evaporation rates such as propylene glycol monomethyl ether or dipropylene glycol monomethyl ether also improve the ink stability in the machine allowing up to 72 hours of printing without any interference of operators to adjust the viscosity. This means the standard of impression also remains constant during this time which, in turn, means a very desirable, stable flexographic printing process.

Figure 2:
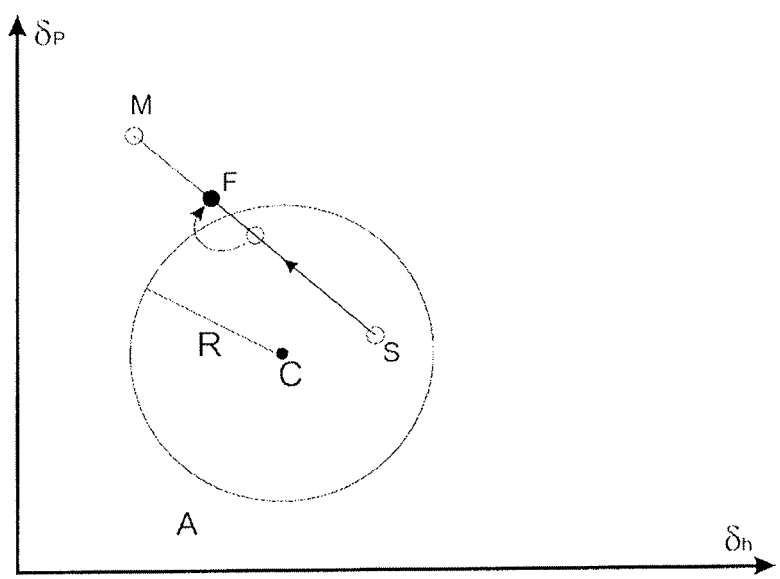
Figure 7:
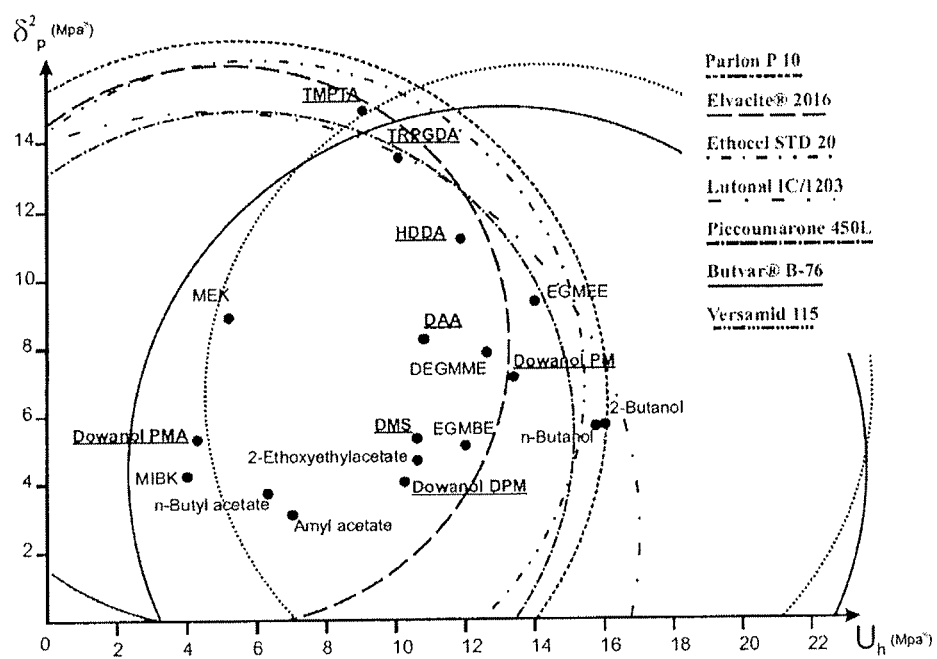
FIG. 7 schematically shows a Hansen Solubility Parameter Chart with the positions of some desired monomers such as HDDA (1,6 Hexanediol Diacrylate), TMPTA (Trimethylolpropane Triacrylate), TRPGDA (Tripropylene Glycol Diacrylate), and some of the most desirable solvents such as the Glycol Ethers and Esters in general.
Figure 8:
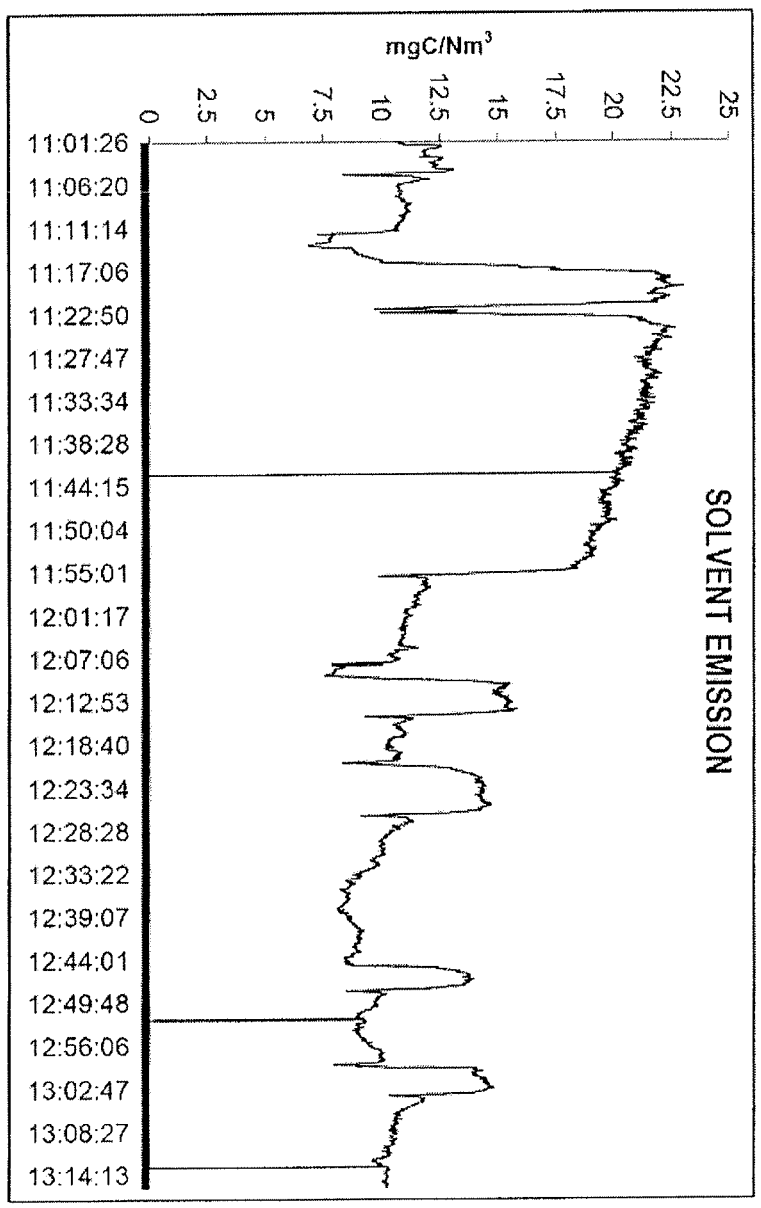
FIG. 8 represent an evaluation chart of VOLATILE ORGANIC COMPOUNDS content during a printing run, and demonstrate the low level of VOLATILE ORGANIC COMPOUNDS of the present invention, with the peak of VOLATILE ORGANIC COMPOUNDS with less than 25 mgC/Nm$^3$ (milligrams of Carbon per Normal cubic meter of air).

The preferred non-reactive solvent used in the present system may or may not dissolve the polymer directly. This is because the monomers, oligomers, and nonreactive solvents used may have Hansen Solubility Parameters outside of solubility region/volume of the polymer as shown in FIGS. 1, 2, and 7. This is possible, since it is their mixtures that must have the appropriate Hansen Solubility Parameters to allow control of the printing process as disclosed here.

It is mandatory, however, that the medium, after the partial or total evaporation of any nonreactive solvent in the formulation, is a non-solvent for the polymer, or given segments of the polymer, in order to control formation of a the gel.

If there is no solvent in the present ink, i.e. the flexographic ink is a VOLATILE ORGANIC COMPOUNDS free ink; the radiation curable phase change ink comprises a non-curable gellant consisting of or including a block polymer partially insoluble in the reactive medium at room temperatures of about 15° C. to about 35° C.

The VOLATILE ORGANIC COMPOUNDS free ink of this patent should contain the following components: a curable gellant consisting of or including a block polymer partially insoluble in the medium reactive at room temperatures of about 15° C. to about 35° C., includes additional curable monomers and oligomers as well as curable or non-reactive polymers and gel-promoting additives, selected in such way as to prevent the formation of a single phase ink at room temperature in standard conditions, additives and the ink may optionally contain a small amount of a solvent.

Summarizing, the method provides for preparation of a solid, gelled radiation curable ink film using a formulation having a partly soluble polymer, where the partly soluble polymer has blocks or segments that are not soluble in the medium liquid of the ink formed by radiation curable oligomers and monomers. These insoluble segments or blocks join to form the links in the gel in such a way that this gel state is broken by agitation, heat or a combination of both, thus allowing the printing of a liquid ink film. The printed liquid ink reverts to the gelled state after printing and removal of agitation, and can thus be in a condition similar to the final films in a) above. Such films can withstand the physical effects found during printing, and also provide the color trapping required for wet-on-wet multilayer printing processes, particularly flexographic and letterpress printing.

Known organic gellants that are suitable to turn a VOLATILE ORGANIC COMPOUNDS free radiation curable printing ink into a gel at room temperature said gel being easily destroyable by means of temperature, agitation, or combination of both, creates a possibility to produce a system and the right ink formulations to overcome the limitations that still obligate the formulas to contain a non reactive diluents to the wet on wet printing process in flexography and at the same time avoid the use of high viscosity inks in letterpress that demands more pressure and exhibits more difficulties to print.

Preferably, the gellant forms a solid-like gel state in the ink medium at temperatures below the temperature at which the ink will be printed and handled by the inking system and this solid-like gel is based in the physical gel formation that exhibit two phases, one constituted by a network formed by the non completely solved polymer by non-covalent bonding interactions such as hydrogen bonding, Van der Waals interactions, aromatic non-bonding interactions, ionic or coordination bonding, London dispersion forces, and the like, and the second phase constituted by the medium liquid inside the cavities of the polymer network.

With the use of physical forces such as temperature or mechanical agitation, the gel of the present invention can be reversed into a liquid with just one phase, close to a sol system and showing a desirable viscosity to the selected printing process.

The flexographic printing ink based on phase change as per the present invention, include a photoinitiator when the intended cure process is desired to be an Ultra Violet light means, both by free radical or cationic cure.

Photoinitiator useful for the present invention includes but not limited to 2,4,6-trimethylbenzoyldiphenylphosphine oxide; bis(2,4,6-trimethylbenzoyl)-phenyl-phosphine oxide; 2-methyl-1-(4-methylthio)phenyl-2-(4-morphorlinyl)-1-propanone; 2-benzyl 2-dimethylamino 1-(4-morpholinophenyl)butanone-1; 2-dimethylamino-2-(4-methylbenzyl)-1-(4-morpholin-4-ylphenyl)-butanone; diphenyl-(2,4,6-trimethylbenzoyl)phosphine oxide; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; and mixtures thereof.

The use of amine synergists, such as ethyl-4-dimethylaminobenzoate and 2-ethylhexyl-4-dimethylaminobenzoate is highly recommended due to its influence on overall cure speed.

The photoinitiator range from about 0.5 to about 25%, preferably from about 1 to about 10%, by weight of the ink. The above remarks on photoinitiators apply also to the first embodiment, i.e. to the reduced solvent ink above discussed.

The desirable viscosity of less than about 4000 cps in the application condition (temperature and agitation), preferably less than 2500 cps and mostly preferably less than about 1000 cps, and a hardness of at least 4 shore 00 under ASTM D2240-05 Standard Test Method for Rubber Property.

The temperature variation to ensure the transition between both states, gel to liquid is below 80° C., and preferably below 40° C., i.e. if the desired final temperature is a room temperature of 28° C., the application temperature must be below 108° C. and preferably below 68° C.

The easy way to assure the temperature reduction is the refrigeration of the flexographic central drum and the counter-pressure cylinder in letterpress. As the substrate is surrounding those cylinders, the temperature of the applied ink decrease faster, leading to gellation.

The VOLATILE ORGANIC COMPOUNDS free ink does not contain solvents but only monomers, oligomers, polymer (which act as a gellant) and additives; forming a radiation curable medium that are comprised by one or more of Polyester acrylates, Epoxy acrylates, Acrylic acrylates, and Polyurethane acrylates, Trimethylolpropane Triacrylate (TMPTA), Tripropyleneglycol Diacrylate (TRPGDA), 1,6-Hexanediol Diacrylate (HDDA), n-Vinyl Pyrrolidone (NVP), n-Methyl Pyrrolidone (NMP), and the like.

The choice of suitable polymers to practice this invention requires care. The selection is really restricted by the need to find a polymer having a boundary of solubility which can be used to advantage. The final liquid ink formulation must have Hansen Solubility Parameters near this border, with control over how the Hansen Solubility Parameters may change during the printing process. Among the most adaptable polymers are the Polyvinyl Butyrals and some polymers or copolymers of methyl methacrylate or other acrylic copolymers.

If there is no solvent in the present ink, i.e. the flexographic ink is a VOLATILE ORGANIC COMPOUNDS free ink; the radiation curable phase change ink comprises a curable gellant consisting of or including a block polymer partially insoluble in the reactive medium at room temperatures of about 15° C. to about 35° C.

The use of the composite gellant, e.g. a partially soluble polymer, enables the ink to form a gel state having a hardness of at least 4 shore 00 by the ASTM D2240-05 Standard Test Method for Rubber Property at temperatures of about 15° C. to about 35° C. To obtain the fluidity required for use in the flexographic printing process, the ink is heated or stirred (i.e. shear forces are applied to the ink), or both, so that the gel state is destroyed and the ink has enough fluidity (i.e. a viscosity of less than 4000 cps and preferably less than 2500 cps and mostly preferably below 1000 cps) to be handled by the printing system in a manner to be applied in the final substrate.

The gel formation process in the case of the present invention is strictly limited to physical bonds, using, as above mentioned, a very low level of polymer, with a range between 0.1% to a 10% in a medium of more than 50% of liquid of the final formulation, where the majority is composed by a reactive non-volatile monomer or monomers and oligomers, preferably low viscosity ones that necessarily have appropriate Hansen Solubility Parameters.

One very important property of gels that relates to the two main concepts of the present patent (Gel formation and Hansen Solubility Parameters) is the influence of solvency of the medium on the gel strength obtained by the degree of network formation that gives more or less rigid gel structure (hardness) and stickiness (tack). In a very poor polymer solubility medium, the polymer molecules are spread out within the medium as a network, rather than being clumped together, as briefly explained above.

This creates a very strong gel structure created by a polymer network with a liquid phase within it.

The selection of the polymer and the formulation of the ink composition are done to avoid phase separation (liquid-solid) when the gel system is formed. A careful balance of the Hansen Solubility Parameters is required.

The polymer network formed in the gel must retain the relatively large amount of liquid inside the network, which means that some attraction level, sometimes called solvation, must be maintained between extended polymer chains and the liquid. It can be seen, therefore, that the formation of the right kind of gel is connected to the other important concept of the present invention, controlling the Hansen Solubility Parameters to provide the correct degree of gel strength at the right time.

It was found that ink gels suitable for the present invention and capable of withstanding subsequent printing and provide wet trapping are those that have hardness of at least 4 shore 00 by the ASTM D2240-05 Standard Test Method for Rubber Property, Durometer Hardness. See www.astm.org and ASTM Volume 09.01 Rubber, Natural and Synthetic—General Test Methods; Carbon Black. Preferred hardness is of at least 7 Shore 00 and most preferably at least 10 Shore 00. The upper limit is selected according to the final use and is preferably (but not necessarily) of 50 Shore 00 and more preferably of 25 Shore 00. The hardness of the gel of the prepared sample is measured 15 minutes after the gelled ink has reached a constant weight, i.e. after complete solvent evaporation, at room temperature (i.e. 15 to 35° C.). In the case of solvent free ink formulations, gel hardness of the prepared sample is measured 30 minutes after gel forming, at room temperature (i.e. 15 to 35° C.).

Preferred polymers include, but are not limited to, Butvar® B76, Butvar® B79, Butvar® B90, Butvar® B98 produced by Solutia, Inc, Elvacite® 2013, Elvacite® 2016, Elvacite® 2046, produced by Lucite International, Inc. Other suitable polymers are dendritic polymers having different polymer segments; an example of this type of polymers is Boltorn® U3000 produced by Perstorp.

The amount of polymers in the final ink composition, before it is gelified is within the range of 0.5% to 15% (w/w) of the total ink composition, preferably, between 1% to 5% by weight of the total ink formulation.

The Hansen Solubility Parameters of many more polymers and monomers and oligomers can be defined in order to formulate further ink compositions according to the present patent.

The polymer precipitation will act in the radiation curable medium similar to the action of a magneto applied to a medium of iron balls, diffusing its surface energy by the whole system and leading to a gelation of the system. The precipitation or gelation may be adjusted to occur even if only a small part of the solvent is evaporated and can show the results much faster and stronger than the viscosity increase.

The radiation curable phase change ink compositions also comprises of a curable epoxy-polyamide composite gellant in an amount from about 1% to about 50% by weight of the ink, more preferably from about 5% to about 25% by weight of the ink, and most preferably from about 7% to about 15% by weight of the ink, although the value can also be outside of this range.

According to the present invention, the gelation is also obtained from non reactive polymers, advantageously but not necessarily even with a very small quantity of solvent, especially depending on the Polymer selected. Useful percentages of those solvents may vary from 1% up to 15% (w/w) of the total ink composition.

For example, where the organic gellant is cationically curable (e.g., wherein the curable functional groups include epoxy, vinyl ether, allyl, styrene and other vinyl benzene derivatives, or oxetane groups), additional cationically curable monomers or oligomers may be included in the ink vehicle.

Cationically curable monomers may include, for example, cycloaliphatic epoxide, and preferably one or more polyfunctional cycloaliphatic epoxides. The epoxy groups may be internal or terminal epoxy groups such as those described in WO 02/06371, incorporated herein by reference. Multifunctional vinyl ethers can also be used.

The additional curable monomers and oligomers as well as curable or non-reactive polymers and gel-promoting additives, selected in such way as to prevent the formation of a single phase ink at room temperature in standard conditions.

The criteria to select the monomers can be summarized by the following basic points referring to Hansen Solubility Parameter positions in FIGS. 1, 2 and 7:

a) The Hansen Solubility Parameter average for the final monomer/oligomer combination (one or more monomers) must not directly dissolve the chosen polymer, that is the point in the figures for this mixture will be outside the region of complete solubility for the polymer;

b) The Hansen Solubility Parameter average for the final monomer/oligomer combination is preferred to be close to the polymer solubility border in order to minimize the amount of solvent to be used and to take additional advantage of the gel breakage with increased temperature. That is the point representing this mixture should be very close to the boundary of solubility in FIGS. 1, 2 and 7, but just outside of this region;

c) The final monomer/oligomer combination must be selected in order to produce a low viscosity ink (less than 4000 cps and preferably less 2500 cps and mostly preferably below 1000 cps);

d) The selection of monomer is tailored to the final application, for instance, only some of the radiation curable monomers are allowed to be used to produce Flexible Food Packaging, which means that the formulation for Flexible Food Packaging must follow the country or regional regulations.

e) The monomer's boiling point must preferably be higher than that of any nonreactive solvent that may be present in order to keep the monomers within the ink layer after the nonreactive solvent has evaporated.

The chosen monomers or oligomers on a Hansen Solubility Parameter chart of the kind shown in FIGS. 1, 2, and 7. The experimental determinations are certainly the most reliable and will lead to the most probable values of the monomers in the solubility space, but minor revision of these Hansen Solubility Parameter values can be expected.

Use of the experimental method allowed determination of the Hansen Solubility Parameters for a number of UV/EB monomers that can beneficially be used in formulations according to this invention. These values can be advantageously used on plots of the kind given in FIGS. 1, 2, and 7, for example, or even with more refined computer processing if such is available.

Preferred radiation curable materials are selected, without limiting, from the following group: Trimethylolpropane triacrylate (TMPTA), 1,6-Hexanediol diacrylate (HDDA), Tripropylene Glycol Diacrylate (TRPGDA), Ethoxylated (3) Trimethylolpropane Triacrylate (TMP3EOTA), Ethoxylated (6) Trimethylolpropane Triacrylate (TMP6EOTA), Ethoxylated (9) Trimethylolpropane Triacrylate (TMP9EOTA), Propoxylated (6) Trimethylolpropane Triacrylate (TMP6POTA), Propoxylated (3) Glyceryl Triacrylate (G3POTA), Di Trimethylolpropane Triacrylate (DTMPTA), Dipropylene Glycol Diacrylate DPGDA, Ethoxylated (5) Pentaerythritol Tetraacrylate (PPTTA), Propoxylated (2) Neopentyl Glycol Diacrylate (NPG2PODA), Ethoxylated (2) 1,6 Hexanediol Diacrylate (HD2EODA).

The amount of monomers in the final ink composition, before it is gelified is within the range of 0% to 80% (w/w) of the total ink composition, preferably, between 30% to 50% by weight of the total ink formulation.

The addition of monomers is useful since the combination of monomers, oligomers, and nonreactive solvents allows control over the Hansen Solubility Parameters of the formula at all times, and gives a good solvency to selected polymers, with resulting low viscosity and high solids. Since monomers will not be evaporated with the solvent due to their higher boiling point and since they will not be present in the cured ink as such, having been reacted into the cross-linked ink during the final cure, they are included in the solids.

In case oligomers are used instead of monomers, the non reactive polymer should be incompatible with the chosen oligomers and have a very low viscosity to allow the formulation of the ink with a desirable viscosity, preferably between 1000 cps to 2500 cps. The preferred percentage of oligomers is within the range of 45% to 60% by weight of the total formulation.

The recommended oligomers to be mixed or not with monomers includes, but are not limited to, low viscosity Epoxy Acrilate, Amine Acrilate, Polyester Acrylate, Epoxidized Soybean Oil Acrylate. The oligomers are present in an amount of 0 to 80% (w/w) of the total ink composition; the total amount of oligomers and monomers preferably is within the range of 10% to 35% (w/w) of the total ink composition.

In this patent, ink additives can be diluents, colorants, stabilizer additives, leveling additives, dispersing additives and/or synergist additives.

The reactive diluents material is preferably added to the ink in amounts of from, for example, 0 to about 80% by weight, preferably about 1 to about 80% by weight, more preferably about 35 to about 70% by weight, of the ink.

Useful colorants for the system includes all main organic pigments as per the following non-limiting list: Yellow 3, Yellow 12, Yellow 13, Yellow 17, Yellow 74, Yellow 83, Yellow 114, Yellow 121, Yellow 139, Yellow 176, Orange 5, Orange 13, Orange 34, Red 2, Red 53.1, Red 48.2, Red 112, Red 170, Red 268, Red 57.1, Red 148, Red 184, Red 122, Blue 15.0, Blue 15.3, Blue 15.4, Violet 19, Violet 23, Green 7, Green 36 and Black 7. The use of inorganic pigments like Titanium Dioxide is mandatory for white inks and some iron pigments are desirable for certain applications.

Additives play an important role in the formula, especially in order to achieve a high pigment loading with low viscosity and to improve some final properties like wettability of plastics substrates, scratch resistance, foam control, etc.

Main additives recommended include, but are not limited to, Byk 019™, Byk 023™, Byk 361™, Byk 3510™, Disperbyk 163™, Dysperbyk 168™ (manufactured by Byk Chemie), Foamex N™, Airex 900™, Tegorad 2100™, Tegorad 2500™, Tego Dispers 651™, Tego Dispers 685™, Tego Dispers 710™ (manufactured by Tego Chemie), Solsperse 5000™, Solsperse 22000™, Solsperse 32000™, Solsperse 39000™ (manufactured by Noveon), DC 57™, DC190™, DC 200/500™ (manufactured by Dow Corning), Genorad 21™ (manufactured by Rahn), Omnistab 510™ (manufactured IGM Resins).

The amount of colorants and additives is within the usual range in this art. However, the type and amount of colorant will affect the gel hardness.

Based on the concept described in the present invention many formula variations of the kind described here may be implemented by formulators skilled in the art. There are a large number of choices regarding nonreactive solvents, solvent-soluble resins, monomers and oligomers that would allow compliance with the claims of this invention. Also, the Hansen Solubility Parameters for many other monomers and oligomers are not currently known. Such data would help develop ink formulations within the scope of this invention without requiring numerous trials.

This invention also allows formulation of inks with very strong color, which in turn allows satisfactory application of thinner ink films. Such inks require polymer along with the monomers and/or oligomers in order to incorporate the pigments in a well dispersed and stabilized manner to give transparent, glossy and pure color inks. The amount of ink applied is such as to obtain a thin ink layer: the thinner the ink layer, the more rigid this layer will be since it is closer to the solid state, as well as to a substantially more rigid base to the other ink layers that will be printed over it.

The inks formulated according to this invention can be applied in traditional Flexographic Machines, also with a conventional anilox cylinder and doctor blade, but it is desirable to improve the anilox cylinder to near 480 lines/cm and less than 2.5 $cm^3/m^2$ (1200 lines per inch and 1.6 BCM) in terms of four process colors and 250 lines/cm-5.5 $cm^3/m^2$ (600 lines per inch and 3.5 BCM) for white and black colors using a thick blade or a blade like the Superhoned® Gold by Allison Systems Corp.

According to an aspect of the invention, to achieve wet trapping in all trial conditions, especially when the maximum trapping of colors is below 300% (maximum 3×100% colors overprinted), a little quantity of air insufflations is used in order to assure the complete removal of all solvents of the dried film. This reduces the possibility of residual odor or solvent to be retained, especially dealing with food package purposes.

Cold air is usually suitable for this purpose. This will significantly reduce use of energy and contribute to reduction of $CO_2$ emissions since gas burning driers can be avoided. This is made possible by the use of the gel technique of the invention and the destruction of the gel by the heat of reaction generated during the cure process itself, such that no external heat is required.

Moreover, if the ink layer is thin, the evaporation of any residual nonreactive solvent will occurs much easier, which means lowered heat demands, and also faster drying. This can lead to avoid the use of any external heat source particularly since the physical gel is broken by heat generated by the polymerization reaction during the cure step of the invention process; this heat of reaction is sufficient to evaporate any nonreactive solvent present.

As previously mentioned, VOLATILE ORGANIC COMPOUNDS (VOC) emissions in the invention process are dramatically low and lower than known printing processes because the invention results in extremely high solid inks with very low levels of nonreactive solvents that require less attention by printers and also show very good performance compared to any other UV/EB or solvent/water inks.

In the following Table 2, comparative results for the same operating conditions are given.

final result in terms of VOLATILE ORGANIC COMPOUNDS emission is 15 times less emission in the UV/EB invention inks than in a pure solvent base ink.

FIG. 1 schematically demonstrates the concept of the present invention based on the Hansen Solubility Parameter. FIG. 1 uses δp, the Polar Hansen Solubility Parameter versus δh, the Hydrogen Bonding Hansen Solubility Parameter. All the good solvents for the polymer define the solubility region (solubility sphere since there are three Hansen Solubility Parameters). This is schematically given by the circle A having a center C and radius R. All liquids, whether reactive or not, such as solvent (S) within the circle will dissolve the polymer while the monomer (M) will not since its location is outside of the solubility sphere.

FIG. 2 uses the same type of plot as FIG. 1 to demonstrate the change in the Hansen Solubility Parameters of the ink after evaporation of a nonreactive solvent S. As it can be observed by comparing these figures, the average Hansen Solubility Parameters of the liquids (F) in the ink move from just within the circle boundary in the as-supplied state, to just outside of this boundary after removal of any nonreactive solvent. The desired gel formation is then effected.

As previously mentioned in given cases it may be possible to use a polymer with special segments that are not soluble in the liquid of the ink as supplied, with gel formation from the start. This gel can be readily degraded by shear forces in the printing process to provide a liquid that can be transferred within the printing equipment as described above. The gel is then reestablished between the steps where the different colors are applied in the wet on wet printing process. There are no shear forces of significance after the ink is applied, so the gel will be formed rapidly again.

As described by many authors skilled in the art, such as Van Kevelen and Hoftyzer (Van Krevelen, D. W.; Hoftyzer, P. J. *Properties of Polymers. Correlation with Chemical Structure*; Elsevier: N.Y., 1972.), Hansen (Hansen, Charles (2000). *Hansen Solubility Parameters: A user's handbook*. Boca Raton, Fla.: CRC Press) and Hoy (K. L. Hoy, The Hoy tables of solubility parameters, Union Carbide Corp., 1985), a combination of two compounds in a suitable amount can result in a theoretical new single solvent. In the present situation, the formulated solvent F (50% monomer M and 50% solvent S) results exactly in the middle point of the line that joins both S and M. Since the "new solvent" is inside the solubility area, it will be able to dissolve a solvent resin A. On the other hand, monomer M is a high molecular and high boiling point and after printing in the flexographic process, solvent S, that is much more volatile than monomer M, begins to evaporate. As a consequence, the point that represents in the graphic the formulated solvent F moves towards the "remaining solvent". FIG. 2 shows the new position of formulated solvent F after 50% of solvent S evaporation and no evaporation of monomer M.

TABLE 2

Comparison of solvent emission based in a UV/EB formulation

| Type of Flexo Ink | Solvent content (%) | Strength (%) | Application (g/m²) | Production (m²) | Ink used (kg) | Solvent emission (kg) |
|---|---|---|---|---|---|---|
| UV/EB -Invention | 10% | 250% | 2 | 1,000,000 m² | 2000 | 200 |
| Standard Solvent ink | 60% | 100% | 5 | 1,000,000 m² | 5000 | 3000 |

The Table 2 above demonstrates a comparison of solvent emission based in a UV/EB formulation designed following the present patent basis against the usual solvent base ink. The The process continues up to the point where there is no solvent S left and the formulated solvent F is coincidental with monomer M because it will be the unique present compound. But much before that situation, the formulated solvent F will be out of the solubility area of the solvent-based resin A, and then the solvent-based resin A will precipitate in the medium of monomer M, giving the ink a gel consistency that is enough to support the overprint process. Experiments show an ink with "good" to "excellent" color trapping.

The formation of a suitable gel network in the ink after its application and prior to application of subsequent inks of different colors and radiation curing of the whole composite layered print comprises the following steps:
  a) formulating a radiation curable ink system suitable for wet on wet flexographic printing by combining non-reactive polymers and, if desired, small amounts of non-reactive solvents with reactive monomers and oligomers;
  b) enabling the wet on wet printing capability by a new mechanism known as Hansen Solubility Parameter control by means of evaporation of any non-reactive solvent, leading to precipitation of the non-reactive polymer to form a gel with sufficient strength to support the sequential color overprint process, or alternatively adjusting the Hansen Solubility Parameters with reactive monomers and oligomers only such that a polymer with both soluble and insoluble segments in the mix of reactive monomers and oligomers without any nonreactive solvent, can attain suitable gel strength by precipitation of the non-soluble segments, recognizing that the shear forces during application of the ink will reversibly render it to be a liquid, thus allowing its ready application and cure;
  c) applying all sequential colors to complete the flexographic printing process, said colors are prepared based on the above mentioned new mechanism;
  d) curing simultaneously all the ink layers collectively at the end of the process using EB or UV radiation.

This new mechanism is extremely helpful and can reduce significantly, or perhaps even eliminate, the volatile, nonreactive solvent in the formulation.

The similarity of operational care between this family of inks and the customary solvent based inks also ensures the easy adaptation of the printers to the new technology.

To simplify the calculations and the presentation, the Hansen dispersion parameter for the reactive monomers has not been considered in these cases, since it is reasonably similar to the Hansen dispersion parameter of the other components in the system all of these being linear in structure and not having halogens or other larger atoms of the kind that increase the dispersion parameter.

Illustrative examples of some formulations produced according to the present invention are given below. These examples, however, can not be construed as limiting. Alternatives or variations encompassed within the scope of the claims are clearly to be considered as being within the scope of this invention.

Table 3 below resumes the Hansen solubility parameters of the some usual raw materials in the market, including the ones chosen for the following formulation examples.

TABLE 3

Hansen solubility parameters of the some usual raw materials in the market

| PRODUCT | $\delta p$ $(J/cm^3)^{1/2}$ | $\delta h$ $(J/cm^3)^{1/2}$ | $R_0$ |
|---|---|---|---|
| MONOMERS | | | |
| TMPTA | 15.0 | 9.0 | |
| HDDA | 11.2 | 11.8 | |
| TRPGDA | 13.5 | 10.0 | |
| SOLVENTS | | | |
| Diethyl Carbonate | 3.1 | 6.1 | |
| Dimethyl Carbonate | 3.9 | 9.7 | |
| Dowanol DPM[1] | 4.1 | 10.2 | |
| Dowanol PM[2] | 7.2 | 13.6 | |
| n-Butyl Propionate | 1.6 | 3.3 | |
| Proglyde DMM[3] | 2.1 | 3.8 | |
| PIGMENT | | | |
| CARBON BLACK | 6.0 | 5.5 | |
| POLYMERS | | | |
| Butvar B76 | 4.3 | 12.7 | 10.4 |
| Parlon P10 | 6.2 | 5.3 | 10.4 |
| Ethocel STD 20 | 6.9 | 5.9 | 9.9 |
| Lutonal IC/1203 | 2.5 | 4.6 | 12.4 |
| Piccoumarone 450L | 5.4 | 5.6 | 9.4 |
| Elvacite 2016 | 8.0 | 5.0 | 8.2 |

[1] Dipropylene Glicol Methyl Ether
[2] Propylene Glicol Methyl Ether
[3] Dipropylene Glicol Dimethyl Ether

EXAMPLE 1

Ink with Small Amount of Solvent

Formula A is for an EB curable ink formulated according to the present invention for a non-food application that contains only 5% solvent and 0.5% of Polymer (Polyvinyl Butyral—Butvar® B76): Formula A is showed on Table 4 below.

TABLE 4 ink with small amount of solvent
FORMULA A

| Product | Trade Name | Supplier | Yellow | Magenta | Cyan | Black |
|---|---|---|---|---|---|---|
| Additive | Omnistab 510 | IGM Resins | 0.5 | 0.5 | 0.5 | 0.5 |
| Additive | Tego Glide 432 | Tego Chemie | 1.0 | 1.0 | 1.0 | 1.0 |
| Additive | Tego Dispers 685 | Tego Chemie | 4.0 | 2.5 | — | — |
| Additive | Disperbyk 168 | Altana | 3.0 | 5.5 | 6.5 | 5.0 |
| Monomer | TMPTA | Cytec | 51.0 | 51.0 | 51.0 | 48.5 |
| Monomer | HDDA | Cytec | 5.0 | 5.0 | 5.0 | 4.5 |
| Epoxidized Soy Bean Oil Acrylate | CN111 | Sartomer | 5.5 | 6.0 | 6.0 | 6.0 |
| Additive | Solsperse 22000 | Noveon | 2.0 | — | — | — |

TABLE 4-continued ink with small amount of solvent
FORMULA A

| Product | Trade Name | Supplier | Yellow | Magenta | Cyan | Black |
|---|---|---|---|---|---|---|
| Additive | Solsperse 5000 | Noveon | — | — | 1.5 | 2.0 |
| Yellow Pigment | Irgalite Yellow LCT | CIBA | 22.5 | — | — | — |
| Magenta Pigment | Permanent Rubine L4B 01 | Clariant | — | 23.0 | — | — |
| Cyan Pigment | Heliogen LBL 7081D | BASF | — | — | 23.0 | — |
| Black Pigment | Special Black 250 | Degussa | — | — | — | 27.0 |
| Polymer | Butvar B76 | Solutia | 0.5 | 0.5 | 0.5 | 0.5 |
| Solvent | Dowanol PM | Dow | 5.0 | 5.0 | 5.0 | 5.0 |
| Viscosity (cps) | | | 1500 | 1750 | 1350 | 2100 |
| Color Density | Anilox: 480 l/cm - 1.85 cm³/m² | | 1.12 | 1.35 | 1.89 | 1.66 |

The production was carried out in a Comexi FW 1508 at a production speed of 350 m/min using only cold air in the interstation drying devices, and cured at 20 kGy in an EZCure-I DF™ produced by ESI (Energy Sciences Inc.— Wilmington, Mass.).

The printed material was tested according to the scotch test method in adhesion and the results are given in the Table 5 below:

TABLE 5

Results from printed materials

| Printed Material | Treatment Level[1] | Scotch Test[2] |
|---|---|---|
| 1—Clear polypropylene | 40 | passed |
| 2—Pearlized polypropylene | 40 | passed |
| 3—Clear polyethylene | 38 | passed |
| 4—White polyethylene | 38 | passed |

[1]Corona treatment
[2]Scotch ® 880

The present formulation shows the following trapping values, where the Achieved values, obtained through the invention, are compared to minimum values obtained according to known offset method.

| | Achieved | Web Offset (min) |
|---|---|---|
| Red: | 75% | 65% |
| Green: | 67% | 75% |
| Blue: | 50% | 70% |

It is clear that gel strength achieved in the above formulation was not sufficient to ensure a minimum desirable trapping value for all colors, even if some colors achieve a little more than the minimum, it shows the inconsistency and potential problems that can occur during the printing runs.

In order to evaluate the formulation above, all variations on the Hansen Solubility Parameter before and after a solvent loss of 5% of the formulation was calculated in the following Table 6 and the following formula A was developed:

TABLE 6

Hansen Solubility Parameter
FORMULA A - GENERAL PURPOSE MONOMERS (NOT FDA APPROVED)

| | INITIAL FORMULA (A1) | | | FINAL FORMULA (A2)* | | |
|---|---|---|---|---|---|---|
| Compound | A1 | $\delta h$ $(J/cm^3)^{1/2}$ | $\delta p$ $(J/cm^3)^{1/2}$ | A2 | $\delta h$ $((J/cm^3)^{1/2}$ | $\delta p$ $(J/cm^3)^{1/2}$ |
| TMPTA | 83.6% | 7.524 | 12.54 | 91% | 8.19 | 13.65 |
| HDDA | 8.2% | 0.9676 | 0.9184 | 9% | 1.062 | 1.008 |
| TRPGDA | 0% | — | — | 0% | — | — |
| Dowanol PM | 8.2% | 1.1152 | 0.5904 | 0% | — | — |
| Total | 100% | 9.6068 | 14.0488 | 100% | 9.252 | 14.658 |

*After all solvent evaporation

After removing all other components of the formulation, and restricting the formula to the compounds which will form the solubilization medium, formula A gives the A1 liquid compound formula, where TMPTA represents 83.6%, HDDA is equal to 8.25% and the 5% solvents in the total formula becomes 8.2% of the liquid medium.

The Hansen Solubility Parameter variation of the initial Formula A1 (before solvent evaporation) and Formula A2 (after solvent evaporation) is given below:

| | $\delta h$ $((J/cm^3)^{1/2}$ | $\delta p$ $(J/cm^3)^{1/2}$ |
|---|---|---|
| Formula A1 | 9.6 | 14.0 |
| Formula A2 | 9.3 | 14.7 |

Due to insufficient trapping in previous example, a behavior of the gel is well studied and hardness was defined as one of the properties that best represent the gel itself.

To provide the readings of the gel hardness, formulations with 5%, 4%, 3%, 2% 1% of polyvinyl butyral (Butvar B76) by weight of the total non volatile was prepared for each basic colors (yellow, Magenta, cyan and Black) and measured by means of a Shore 00 Durometer following the ASTM D2240-05 "Standard Test Method for Rubber Property" produced by Woltest Company—Rua Francesco Mosto, 55-São Paulo-05220-005-SP-Brazil. This test method is based on the penetration of a specific type of indentor when forced into the material under specified conditions; it is an empirical test.

A 150 g of total formula was produced for each color and concentration and gelified in a can to leave the surface free and flat to apply the Shore 00 Durometer reading head and obtain the correct measure.

This kind of Durometer is normally used to measure very soft polymeric foams, such as polyurethane foam used in pillows and mattress and the right reading is considered the reading obtained when the values have stabilized in a sequence of at least 3 consecutive readings. The test is carried out on the gel after evaporation of enough amount of the solvent, in order to change the Hansen solubility parameter and allow the gellification of the ink for the cases where the solvent is present in the formulation to adjust the Hansen solubility parameter or after enough time in the cases of solvent free formulation.

Hardness is read after 15 minutes from the constant weight of the sample, which means the sample lose practically all solvent and reach the highest hardness of the gelled ink.

It was found that this possibility of reading the gel hardness is a very important physical difference between the invention inks and the known inks that are based on viscosity increase upon solvent evaporation. In fact all attempts to read very high viscosity offset inks failed for all types of color because even when a hardness value was detected in a first reading, the sequence of reading does not stabilize, decreasing each time it is repeated to a point when the reading was no longer possible to be done, because the Durometer sank in the viscous ink. This is due to the fact that a viscous ink does not establish a gelated base for the readings.

Figure 12:
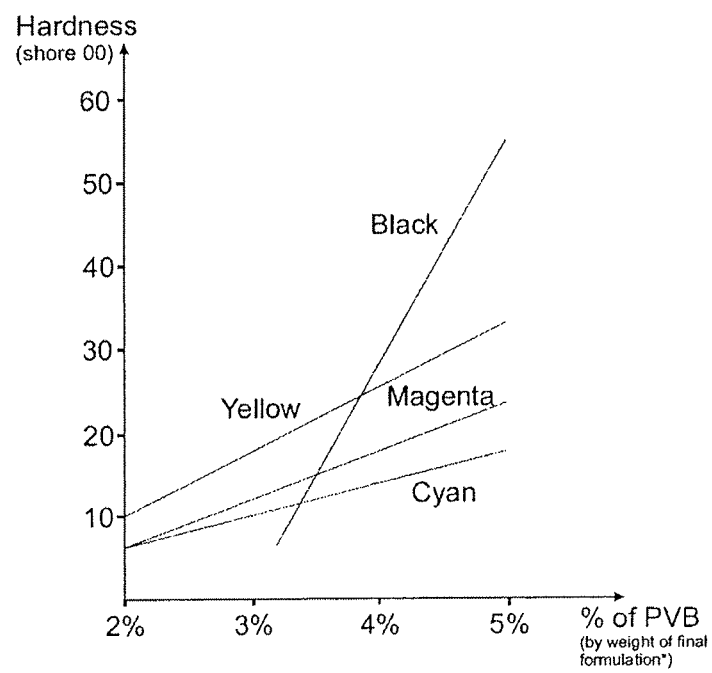
FIG. 12 shows a graphic of the gel hardness vs. gellant concentration for Polyvinyl Butyral (Butvar B76).

The readings in the gel hardness in FIG. 12 explain quite well the results achieved, where only the yellow ink had enough consistency to support the overprinting process. In fact it was found that gel hardness is also depending on the type of pigment used; the same composition may provide a gel having sufficient hardness when yellow pigment is used and a gel not hard enough when black pigment is used, as discussed in the following.

When the composition of Formula A was modified to include a greater amount of polymer, the trapping values improved dramatically as shown in following example 2.

The gel hardness vs. gellant concentration for Polyvinyl Butyral (Butvar B76) is reasonably linear for the selected percentage interval but when hardness decreases below 5-6 shore 00 it is impossible to read it since the gel texture and consistence cannot support the measurement device that tends to sink in the ink. It was found by carrying out empirical tests that below this lower limit value, i.e. 4 Shore 00, the gel strength can no longer support the flexographic overprinting process.

The different behavior of the black inks can be explained as follows. Typical carbon black pigments have Hansen solubility parameters such that they readily adsorb common solvents and/or polymers. This can easily affect the Hansen solubility parameters of the liquid phase in the inks. The absorption of polymers, in particular, leads to a rapid increase in viscosity, since the molecular weight of the carbon black, with say two polymer molecules adsorbed is approximately twice that of the individual polymer molecules. The effect on the viscosity of doubling the molecular weight is greater than that of the two individual polymer molecules.

Data for the most conventional carbon blacks gives the following Hansen solubility parameters to the carbon black: $\delta P$: 6 $(Mpa^3)^{1/2}$ and $\delta H$ 5,5 $(Mpa^3)^{1/2}$, bringing the total Hansen solubility parameter to inside of the solubility performance of Polyvinyl Butyral (Butvar B76).

As the use of the black in all printing tests was programmed to be the last printed color, the results were not affected by the insufficient gel hardness. To overcome the trapping problems of the first formulation and taking the information achieved from the hardness evaluation, a new formula was prepared with 2.5% Polyvinil Butyral in all colors as following:

EXAMPLE 2

Ink with Increased Amount of Polymer

In example 2, the amount of polymer was increased, that means a elevation in the polymer network density and in the amount of change in the Hansen Solubility Parameter, in order to ensure a sufficient distance between the liquid and gel state, avoiding ink gelation in the inking system. Table 7 shows Formula B.

TABLE 7

FORMULA B

| Product | Trade Name | Supplier | Quantity | | | |
|---|---|---|---|---|---|---|
| Additive | Omnistab 510 | IGM Resins | 0.5 | 0.5 | 0.5 | 0.5 |
| Additive | Tego Glide 432 | Tego Chemie | 1.0 | 1.0 | 1.0 | 1.0 |
| Additive | Tego Dispers 685 | Tego Chemie | 4.0 | 2.5 | — | — |
| Additive | Disperbyk 168 | Altana | 3.0 | 5.5 | 6.5 | 5.0 |
| Monomer | TMPTA | Cytec | 46.5 | 46.5 | 46.5 | 44.0 |
| Monomer | HDDA | Cytec | 3.0 | 3.0 | 3.0 | 2.5 |
| Epoxidized Soy Bean Oil Acrylate | CN111 | Sartomer | 5.5 | 6.0 | 6.0 | 6.0 |
| Additive | Solsperse 22000 | Noveon | 2.0 | — | — | — |
| Additive | Solsperse 5000 | Noveon | — | — | 1.5 | 2.0 |
| Yellow Pigment | Irgalite Yellow LCT | CIBA | 22.5 | — | — | — |
| Magenta Pigment | Permanent Rubine L4B 01 | Clariant | — | 23.0 | — | — |
| Cyan Pigment | Heliogen LBL 7081D | BASF | — | — | 23.0 | — |
| Black Pigment | Special Black 250 | Degussa | — | — | — | 27.0 |
| Polymer | Butvar B76 | Solutia | 2.0 | 2.0 | 2.0 | 2.0 |
| Solvent | Dowanol PM | Dow | 10.0 | 10.0 | 10.0 | 10.0 |
| Viscosity (cps) | | | 1250 | 1600 | 1250 | 1900 |
| Density | Anilox: 480 l/cm - 1.85 cm³/m² | | 0.97 | 1.32 | 1.79 | 1.47 |

The production was done in a Comexi FW 1508 at a production speed of 350 m/min using only cold air in the interstation drying devices and cured at 20 kGy in an EZCure-I DF™ produced by ESI (Energy Sciences Inc.—Wilmington, Mass.).

The printed material was tested in adhesion and the results are given in the Table 8 below:

TABLE 8

Results from printed materials

| Printed Material | Treatment Level[1] | Scotch Test[2] |
|---|---|---|
| 1—Clear polypropylene | 40 | Passed |
| 2—Pearlized polypropylene | 40 | Passed |
| 3—Clear polyethylene | 38 | Passed |
| 4—White polyethylene | 38 | Passed |

[1]Corona treatment
[2]Scotch ® 880

The main variation from the previous formula and this one (Formula B) is increasing the amount of polymer (Polyvinyl Butyral—Butvar® B76) from 0.5 to 2.0% and the amount of solvent from 5% to 10%.

It was clear when the new formulation was studied that the amount of the nonreactive solvent was not enough in the formula A to move the Hansen Solubility Parameter of the final liquid mixture to a point sufficiently inside the solubility region of the PVB to ensure the right solubilization. This was not so clear in the first formula due to the amount of PVB in the formula.

The level of solvent needed to adjust to a minimum level of solubilization was recalculated to 17% of the liquid compound (10% of the total Formula B) instead of 8.2% of the liquid formulation or 5% of the total formula of the Formula A. The Table 9 below gives the new situation for the Hansen Solubility Parameters for the Formula B1 (before solvent evaporation) and B2 (after solvent evaporation):

TABLE 9

Hansen Solubility Parameters for the Formulae B1 and B2
FORMULA B - GENERAL PURPOSE MONOMERS (NOT FDA APPROVED)

| | INITIAL FORMULA (B1) | | | FINAL FORMULA (B2)* | | |
|---|---|---|---|---|---|---|
| Compound | B1 | $\delta h$ $((J/cm^3)^{1/2})$ | $\delta p$ $((J/cm^3)^{1/2})$ | B2 | $\delta h$ $((J/cm^3)^{1/2})$ | $\delta p$ $((J/cm^3)^{1/2})$ |
| TMPTA | 78.0% | 7.02 | 11.7 | 93.9% | 8.451 | 14.085 |
| HDDA | 5.0% | 0.59 | 0.56 | 6.1% | 0.7198 | 0.6832 |
| TRPGDA | 0% | — | — | 0% | — | — |
| Dowanol PM | 17.0% | 1.734 | 0.697 | 0% | — | — |
| Total | 100% | 9.922 | 13.484 | 100% | 9.1708 | 14.7682 |

The trapping results here are much improved as seen by the following values:

| | Achieved | Web Offset (min) |
|---|---|---|
| Red: | 89% | 65% |
| Green: | 84% | 75% |
| Blue: | 81% | 70% |

As the above data shows, the trapping values exceed by a good margin the minimum desirable trapping and also showed great stability during to the printing run, even with a lot of stop and go operations. This is the worst scenario for testing trapping stability.

The Hansen Solubility Parameters in the Formula B1 show a good solvency for the polymer (PVB) ensuring a right solubilization with no noticeable tendency to gel formation. After the solvent evaporation, even with use only of cold air and up to 350 m/min in a Comexi FW 1508, the trapping values were considered very acceptable and stable. The changes in the Hansen Solubility parameters are given below:

| | $\delta h$ $((J/cm^3)^{1/2})$ | $\delta p$ $((J/cm^3)^{1/2})$ |
|---|---|---|
| Formula B1 | 9.9 | 13.5 |
| Formula B2 | 9.2 | 14.8 |

EXAMPLE 3

Composition Approved for Food Packing

Using the same general formulation principle, but using only FDA approved monomer for Food Packing, the previous formulations is changed by exchanging HDDA with TRPGDA (Tripropylene Glycol Diacrylate).

In both case, the use of HDDA and/or TRPGDA is directed to bring the TMPTA as close as possible to the solubility border of Butvar® B76 in order to reduce as much as possible the Methoxy Propanol (Dowanol PM) level in the ink, since after its evaporation there is an adverse effect of VOLATILE ORGANIC COMPOUNDS in the atmosphere. Table 10 below shows formula C:

TABLE 10 gelled ink with small amount of solvent
FORMULA C

| Product | Trade Name | Supplier | Quantity | | | |
|---|---|---|---|---|---|---|
| Additive | Omnistab 510 | IGM Resins | 0.5 | 0.5 | 0.5 | 0.5 |
| Additive | Tego Glide 432 | Tego Chemie | 1.0 | 1.0 | 1.0 | 1.0 |
| Additive | Tego Dispers 685 | Tego Chemie | 4.0 | 2.5 | — | — |
| Additive | Disperbyk 168 | Altana | 3.0 | 5.5 | 6.5 | 5.0 |
| Monomer | TMPTA | Cytec | 37.5 | 37.5 | 37.5 | 36.5 |
| Monomer | TRPGDA | Cytec | 12.0 | 12.0 | 12.0 | 11.0 |
| Epoxidized Soy Bean Oil Acrylate | CN111 | Sartomer | 5.5 | 6.0 | 6.0 | 6.0 |
| Additive | Solsperse 22000 | Noveon | 2.0 | — | — | — |
| Additive | Solsperse 5000 | Noveon | — | — | 1.5 | 2.0 |
| Yellow Pigment | Irgalite Yellow LCT | CIBA | 22.5 | — | — | — |
| Magenta Pigment | Permanent Rubine L4B 01 | Clariant | — | 23.0 | — | — |
| Cyan Pigment | Heliogen LBL 7081D | BASF | — | — | 23.0 | — |
| Black Pigment | Special Black 250 | Degussa | — | — | — | 27.0 |
| Polymer | Butvar B76 | Solutia | 2.0 | 2.0 | 2.0 | 2.0 |
| Solvent | Dowanol PM | Dow | 10.0 | 10.0 | 10.0 | 9.0 |
| Viscosity (cps) | | | 1370 | 1640 | 1280 | 2100 |
| Density | Anilox: 480 l/cm - 1.85 cm³/m² | | 0.93 | 1.29 | 1.47 | 1.37 |

The production was carried in a Comexi FW 1508 with a production speed of 350 m/min using only cold air in the interstation drying devices and cured at 20 kGy in an EZCure-I DF™ produced by ESI (Energy Sciences Inc.—Wilmington, Mass.).

The printed material was tested for adhesion with the results being given in the Table 11 below:

TABLE 11

Results from printed material

| Printed Material | Treatment Level[1] | Scotch Test[2] |
|---|---|---|
| 1—Clear polypropylene | 40 | passed |
| 2—Pearlized polypropylene | 40 | passed |
| 3—Clear polyethylene | 38 | passed |
| 4—White polyethylene | 38 | passed |

[1]Corona treatment
[2]Fita Scotch ® 880

Proceeding to the Hansen Solubility Parameter evaluation, the Table 12 below shows the change in these before and after solvent evaporation:

Changes in the Hansen Solubility parameters are indicated below:

| | $\delta h\ ((J/cm^3)^{1/2})$ | $\delta p\ ((J/cm^3)^{1/2})$ |
|---|---|---|
| Formula C1 | 10.0 | 13.4 |
| Formula C2 | 9.2 | 14.6 |

The trapping behavior that was achieved was also good enough for flexographic printing process as presented in the following results:

| | Achieved | Web Offset (min) |
|---|---|---|
| Red: | 99% | 65 |
| Green: | 96% | 75 |
| Blue: | 95% | 70 |

Based on the concept described in the present invention many formula variations of the kind described here may be implemented by formulators skilled in the art. There are a large number of choices regarding non-reactive solvents, sol-

TABLE 12

Changes in the Hansen Solubility Parameter
FORMULA C - MONOMERS FDA APPROVED FOR FOOD PACKAGING

| | INITIAL FORMULA (C1) | | | FINAL FORMULA (C2)* | | |
|---|---|---|---|---|---|---|
| Compound | C1 | $\delta h\ ((J/cm^3)^{1/2})$ | $\delta p\ (J/cm^3)^{1/2}$ | C2 | $\delta h\ ((J/cm^3)^{1/2})$ | $\delta p\ (J/cm^3)^{1/2}$ |
| TMPTA | 63.0% | 5.67 | 9.45 | 75.9% | 6.831 | 11.385 |
| HDDA | 0.0% | 0 | 0 | 0.0% | 0 | 0 |
| TRPGDA | 20.0% | 2 | 2.7 | 24.1% | 2.41 | 3.2535 |
| Dowanol PM | 17.0% | 2.312 | 1.224 | 0.0% | 0 | 0 |
| Total | 100% | 9.982 | 13.374 | 100% | 9.241 | 14.6385 |

C1 are the Hansen solubility parameters before solvent evaporation and C2 are the Hansen solubility parameters after solvent evaporation.

vent-soluble resins, monomers and oligomers that would allow compliance with the claims of this invention. Also, the Hansen Solubility Parameters for many other monomers and oligomers are not currently known. Such data would help develop ink formulations within the scope of this invention without requiring numerous trials.

The invention claimed is:

1. A flexographic printing ink, comprising a non-reactive polymer and a combination of materials selected from the group consisting of monomers, oligomers, diluents, colorants, additives, and photo-initiators, wherein the ink in a liquid state has a viscosity ranging from about 100 cps to about 4,000 cps, and the ink in a gel state has a hardness that can be measured by ASTM D2240-05.

2. The ink according to claim 1, wherein the non-reactive polymer is present in an amount ranging from about 0.1% to about 10% by weight of the ink and the ink is free of volatile organic compounds.

3. The ink according to claim 1, further comprising at least one non-reactive solvent, in an amount ranging from about 1% to about 15% by weight of the ink.

4. The ink according to claim 1 wherein the non-reactive polymer is selected from the group consisting of ketonics, alkyl phenolic, acrylic, methacrylic, polyamide, epoxy-polyamide, modified maleic, modified phenolic, ketone formaldehydes, polyurethane, polyesters, polyvinyl butyrals and mixtures thereof.

5. The ink according to claim 1, wherein the monomers and/or oligomers are present in an amount ranging from about 15% to about 80% by weight of the ink.

6. The ink according to claim 1, wherein the monomers are present in an amount ranging from about 0% to about 80% by weight of the ink.

7. The ink according to claim 1, wherein the oligomers are present in an amount ranging from about 0% to about 80% by weight of the ink.

8. The ink according to claim 1, wherein the oligomers are selected from the group consisting of radiation curable polyester acrylates, low viscosity epoxy acrylates, acrylic acrylates, polyurethane acrylates, amine acrylates, epoxidized soybean oil acrylates and mixtures thereof.

9. The ink according to claim 1, wherein the monomers are selected from the group consisting of trimethylolpropane triacrylate (TMPTA), 1,6-hexanediol diacrylate (HDDA), tripropylene glycol diacrylate (TRPGDA), ethoxylated (3) trimethylolpropane triacrylate (TMP3EOTA), ethoxylated (6) trimethylolpropane triacrylate (TMP6EOTA), ethoxylated (9) trimethylolpropane triacrylate (TMP9EOTA), propoxylated (6) trimethylolpropane triacrylate (TMP6POTA), propoxylated (3) glyceryl triacrylate (G3POTA), di trimethylolpropane triacrylate (DTMPTA), dipropylene glycol diacrylate DPGDA, ethoxylated (5) pentaerythritol tetraacrylate (PPTTA), propoxylated (2) neopentyl glycol diacrylate (NPG2PODA), ethoxylated (2) 1,6 hexanediol diacrylate (HD2EODA); cycloaliphatic epoxide, one or more polyfunctional cycloaliphatic epoxides and multifunctional vinyl ethers; and mixtures thereof.

10. The ink according to claim 1, further comprising a non-reactive solvent selected from the group consisting of glycol ethers and glycol esters, alcohols, ketones, aromatic and aliphatic hydrocarbons, esters, and mixtures thereof.

11. The ink according to claims 1 or 10, further comprising a non-reactive solvent present in an amount ranging from about 1% to about 15% by weight of the ink.

12. The ink according to claim 2, further comprising an organic gellant, in an amount ranging from about 1% to about 50% by weight of the ink, wherein the ink is free of volatile organic compounds.

13. A phase-changing flexographic printing ink free of volatile organic compounds, comprising a non-reactive polymer and a radiation curable medium comprising monomers and/or oligomers, wherein the polymer is partially soluble in the radiation curable medium, the ink in a liquid state has a viscosity ranging from about 100 cps to about 4,000 cps, and the ink in a gel state has a hardness that can be measured by ASTM D2240-05.

14. The ink according to claim 13, wherein said curable medium contains at least one ethylenically unsaturated compound comprising monomers, oligomers and/or mixtures thereof in an amount ranging from about 10% to 70% by weight of the ink.

15. The ink according to claim 12, wherein the gellant is formed by a block polymer partially insoluble in said radiation curable medium at temperatures of about 15° C. to about 35° C.

16. The ink according to claim 13, wherein said curable medium comprises polyester acrylates, epoxy acrylates, acrylic acrylates, polyurethane acrylates, trimethylolpropane triacrylate (TMPTA), tripropyleneglycol diacrylate, 1,6-hexanediol diacrylate (HD2EODA), n-vinyl pyrrolidone, n-methyl pyrrolidone (NMP), isobornyl (meth)acrylate, 2-phenoxyethyl acrylate, and mixtures thereof.

17. The ink according to claim 1, wherein the hardness is measured using a durometer type selected from 0, 00, 000, and 000-S.

18. The ink according to claim 17, wherein the gel has a hardness lower than about 00/50/1.

19. The ink according to claim 17, wherein the gel has a hardness lower than about 00/25/1.

20. The ink according to claim 17, wherein the gel has a hardness of at least about 00/4/1.

21. The ink according to claim 17, wherein the gel has a hardness of at least about 00/7/1.

22. The ink according to claim 17, wherein the gel has a hardness of at least about 00/10/1.

23. The ink according to claim 1 or 13, wherein the temperature differential for the ink to transition from liquid to gel is less than about 40° C.

24. The ink according to claim 1 or 13, wherein the temperature differential for the ink to transition from liquid to gel is less than about 80° C.

25. The ink according to claim 1 or 13, wherein the temperature differential for the ink to transition from liquid to gel ranges from about 40° C. to about 80° C.

* * * * *

UNITED STATES PATENT AND TRADEMARK OFFICE
CERTIFICATE OF CORRECTION

PATENT NO. : 8,729,147 B2  
APPLICATION NO. : 13/432345  
DATED : May 20, 2014  
INVENTOR(S) : Valter Marques Baptista and Wilson Andrade Paduan Page 1 of 2

It is certified that error appears in the above-identified patent and that said Letters Patent is hereby corrected as shown below:

In the Specification

Column 7, line 67,
"scale as Shore 00," should read
--scale as Shore OO,--

Column 14, line 58,
"at least 4 shore 00" should read
--at least 4 shore OO--

Column 15, line 29,
"at least 4 shore 00" should read
--at least 4 shore OO--

Column 16, line 6,
"at least 4 shore 00" should read
--at least 4 shore OO--

Column 16, line 10-11,
"at least 7 Shore 00" should read
--at least 7 Shore OO--

Column 16, line 11,
"at least 10 Shore 00" should read
--at least 10 Shore OO--

Column 16, line 13,
"of 50 Shore 00" should read
--of 50 Shore OO--

Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,729,147 B2

Column 16, line 14,
"of 25 Shore 00." should read
--of 25 Shore OO.--

Column 24, line 66,
"of a Shore 00 Durometer" should read
--of a Shore OO Durometer--

Column 25, line 7,
"the Shore 00 Durometer" should read
--the Shore OO Durometer--

Column 26, lines 3-4,
"5-6 shore 00" should read
--5-6 shore OO--

Column 26, line 7,
"i.e. 4 Shore 00," should read
--i.e. 4 Shore OO,--

In the Claims

Column 32, lines 36-37, Claim 17,
"selected from 0, 00, 000, and 000-S" should read
--selected from O, OO, OOO, and OOO-S--

Column 32, line 39, Claim 18,
"lower than about 00/50/1" should read
--lower than about OO/50/1--

Column 32, line 41, Claim 19,
"lower than about 00/25/1" should read
--lower than about OO/25/1--

Column 32, line 43, Claim 20,
"at least about 00/4/1" should read
--at least about OO/4/1--

Column 32, line 45, Claim 21,
"at least about 00/7/1" should read
--at least about OO/7/1--

Column 32, line 47, Claim 22,
"at least about 00/10/1" should read
--at least about OO/10/1--